US008341865B2

(12) United States Patent
Moody et al.

(10) Patent No.: US 8,341,865 B2
(45) Date of Patent: *Jan. 1, 2013

(54) VERTICAL FORE GRIP WITH BIPOD

(75) Inventors: Joseph R. Moody, Jacksonville, FL (US); Joseph D. Gaddini, Evans, GA (US)

(73) Assignee: Grip Pod Systems International, LLC, Asheville, NC (US)

( * ) Notice: Subject to any disclaimer, the term of this patent is extended or adjusted under 35 U.S.C. 154(b) by 25 days.

This patent is subject to a terminal disclaimer.

(21) Appl. No.: 12/701,157

(22) Filed: Feb. 5, 2010

(65) Prior Publication Data

US 2010/0132239 A1   Jun. 3, 2010

Related U.S. Application Data

(63) Continuation-in-part of application No. 10/725,082, filed on Dec. 2, 2003, now Pat. No. 7,111,424.

(51) Int. Cl.
*F41C 23/00* (2006.01)
(52) U.S. Cl. .................................. 42/72; 42/94; 89/1.42
(58) Field of Classification Search ................ 42/72, 94, 42/71.01; 89/1.42
See application file for complete search history.

(56) References Cited

U.S. PATENT DOCUMENTS

| 271,251 A | 1/1883 | Leerbech |
|---|---|---|
| 575,529 A | 1/1897 | Stephens |
| 721,425 A | 2/1903 | Clyde |
| 1,295,688 A | 2/1919 | Butler |
| 1,355,660 A | 10/1920 | Farquhar |
| 1,382,409 A | 6/1921 | Butler |
| 1,580,406 A | 4/1926 | Browning |
| 2,386,802 A | 10/1945 | Johnson |
| 2,420,267 A | 5/1947 | Sefried |
| 2,436,349 A | 2/1948 | Adams |

(Continued)

FOREIGN PATENT DOCUMENTS

FR   2623595   5/1989

OTHER PUBLICATIONS

Denis H.R., Archer M.A., Jane's Infantry Weapons, 1976, pp. 1-3.

(Continued)

*Primary Examiner* — Michelle Clement
(74) *Attorney, Agent, or Firm* — Brian S. Steinberger; Law Offices of Brian S. Steinberger, P.A.

(57) ABSTRACT

Devices, systems and methods of using an ergonomic fore grip/gun handle with a concealable and collapsible bipod. One version can have a tubular recess consisting of a first cylindrical cutout housing the bipod legs when concealed and a sliding piston that deploys the legs and a second cylindrical cutout housing a release mechanism and a void space for other accessories. The release mechanism has a compression spring positioned between the piston assembly and the bottom of the first cylindrical cutout and the compression spring. The legs are connected to the bottom of the piston assembly via a hinge and spring that when released from confinement within the fore grip, causes the legs to expand outward until fully deployed. Telescoping legs allow adjustment of leg length for use on uneven terrain. The grip portion has an outer surface with a flat surface on sides of the grip to provide a more stable grip, assist in orienting the mounted weapon and support pressure pads for lights.

13 Claims, 40 Drawing Sheets

U.S. PATENT DOCUMENTS

| | | | |
|---|---|---|---|
| 2,489,283 A | 11/1949 | Garand | |
| 2,763,456 A | 9/1956 | Breer | |
| 3,235,997 A | 2/1966 | Stoner | |
| 3,632,073 A | 1/1972 | Nakatani | |
| 4,121,799 A | 10/1978 | Michio | |
| 4,545,660 A | 10/1985 | Rudolf | |
| 4,570,887 A * | 2/1986 | Banister | 248/187.1 |
| 4,640,481 A * | 2/1987 | Kohno | 248/126 |
| 4,807,837 A | 2/1989 | Gawlik | |
| 5,081,478 A | 1/1992 | Hayashida | |
| 5,345,706 A | 9/1994 | Brown | |
| 5,384,609 A | 1/1995 | Ogawa | |
| 5,438,786 A | 8/1995 | Hilderbrand | |
| 6,289,622 B1 | 9/2001 | Desch | |
| 6,487,807 B1 | 12/2002 | Kopman | |
| 6,773,172 B1 * | 8/2004 | Johnson et al. | 396/428 |
| 2004/0060222 A1 | 4/2004 | Oz | |
| 2005/0241206 A1 | 11/2005 | Teetzel | |

OTHER PUBLICATIONS

Brugger & Thomet Unipod, Foreward Grip with Retractable Bipod, [online], DSA Inc. Systems Second to None, DSA Order Center, 1 page, [Retrieved on Oct. 18, 2006] Retrieved from: htlp://www.dsarms.com/item-detail.cfm?ID=BT21830A&storeid=1&image=bt21830A.gif.

* cited by examiner

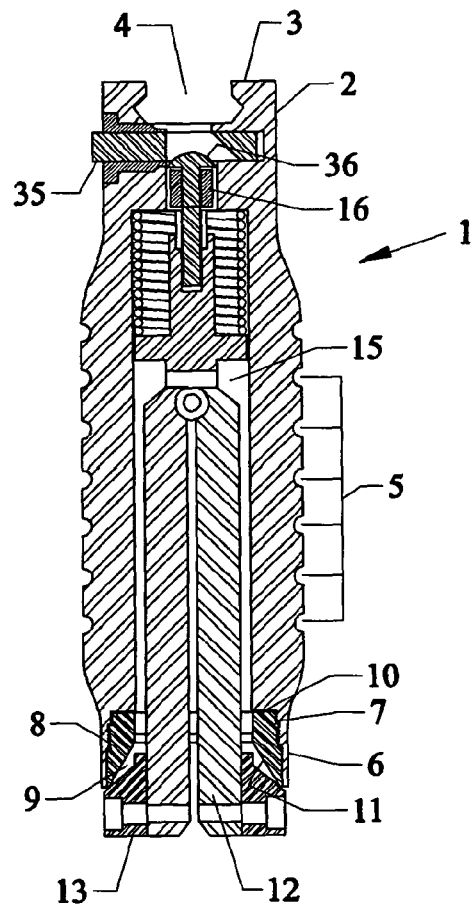
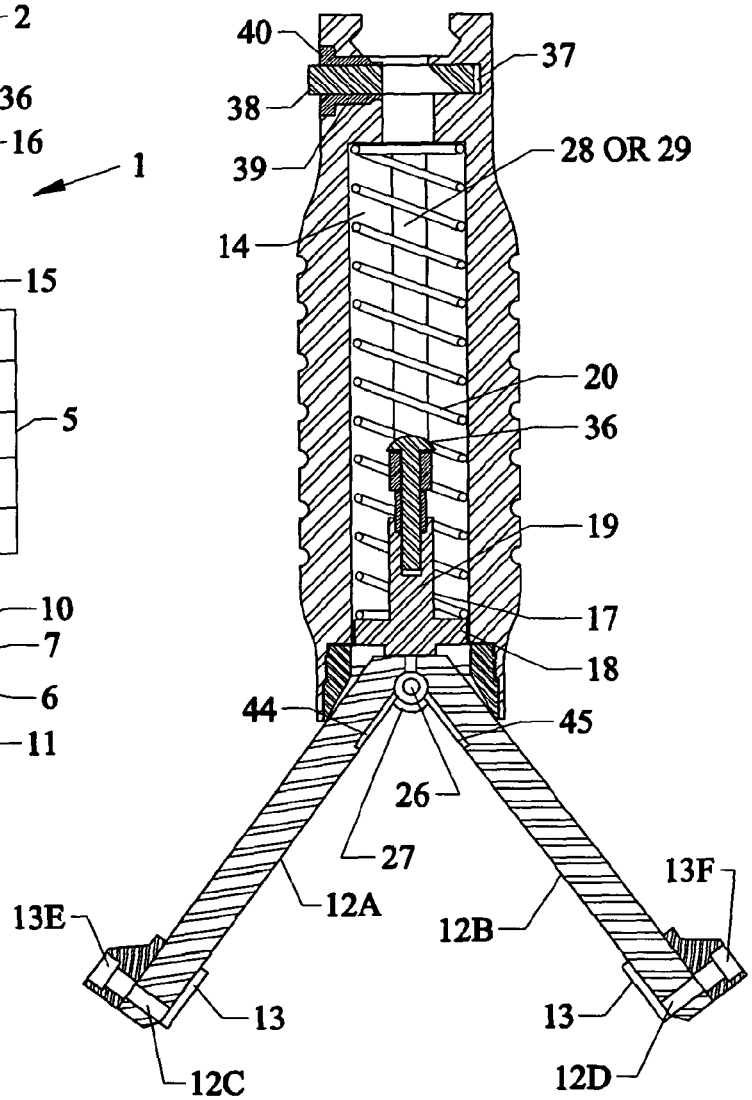

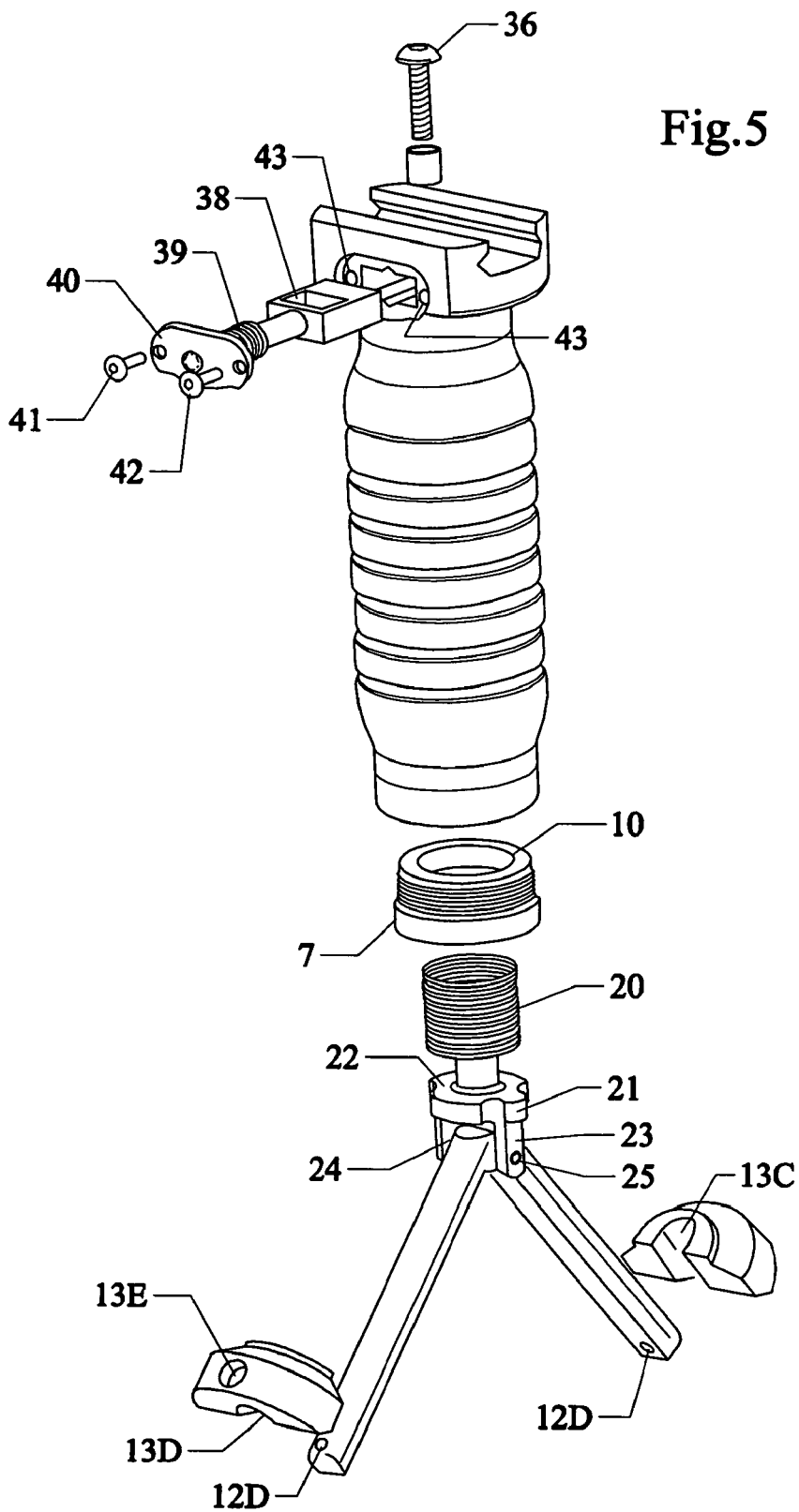

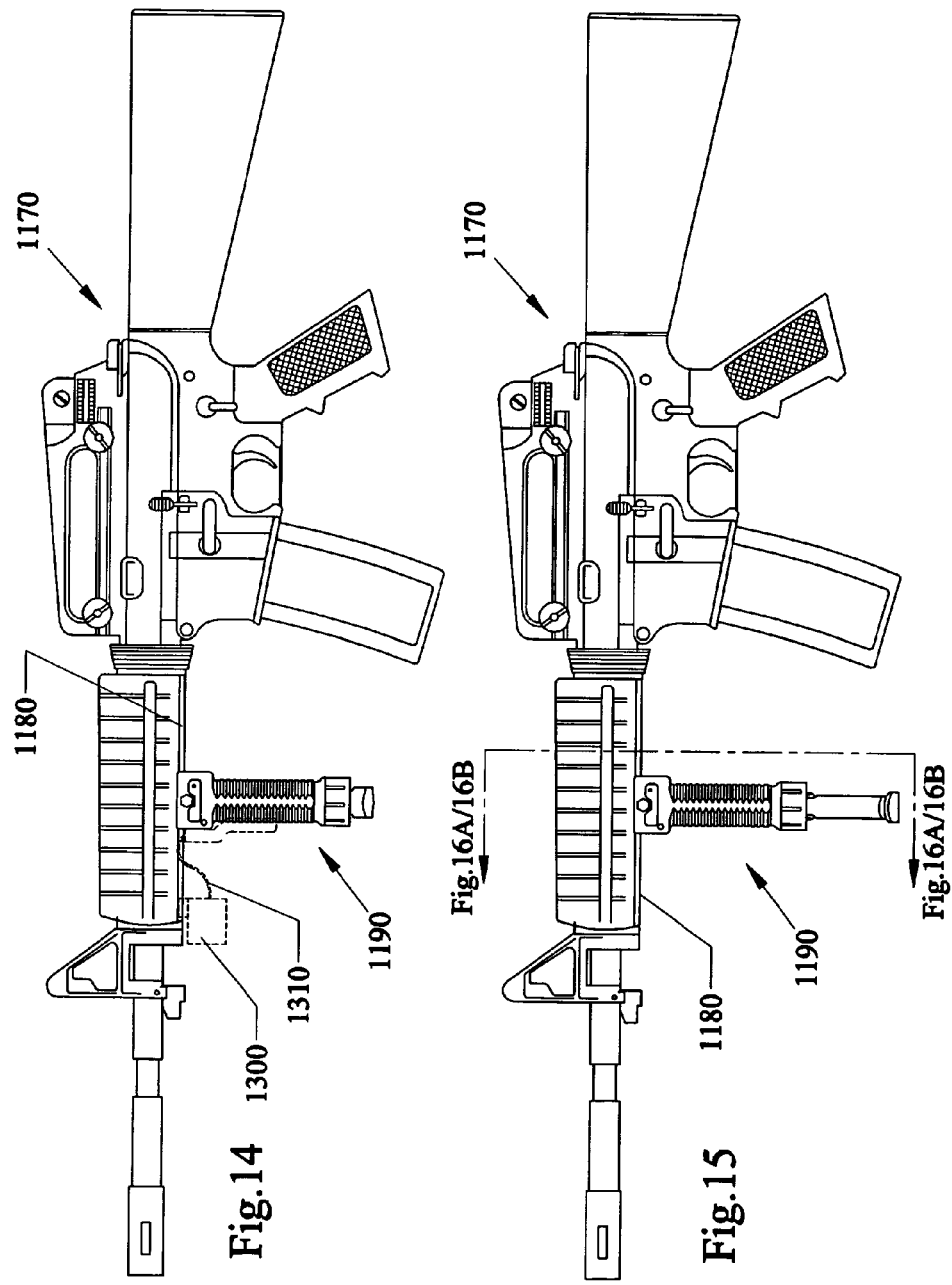

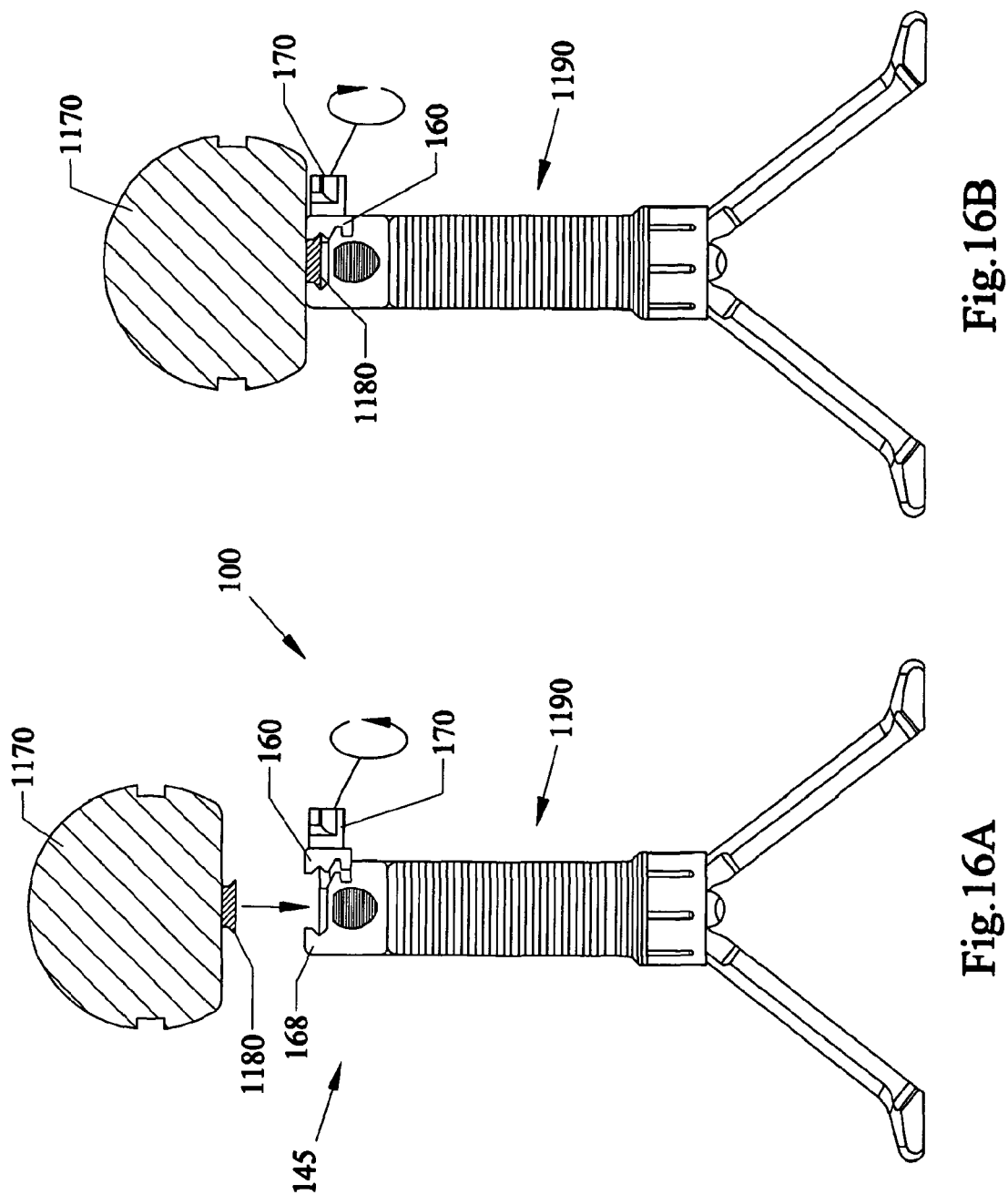

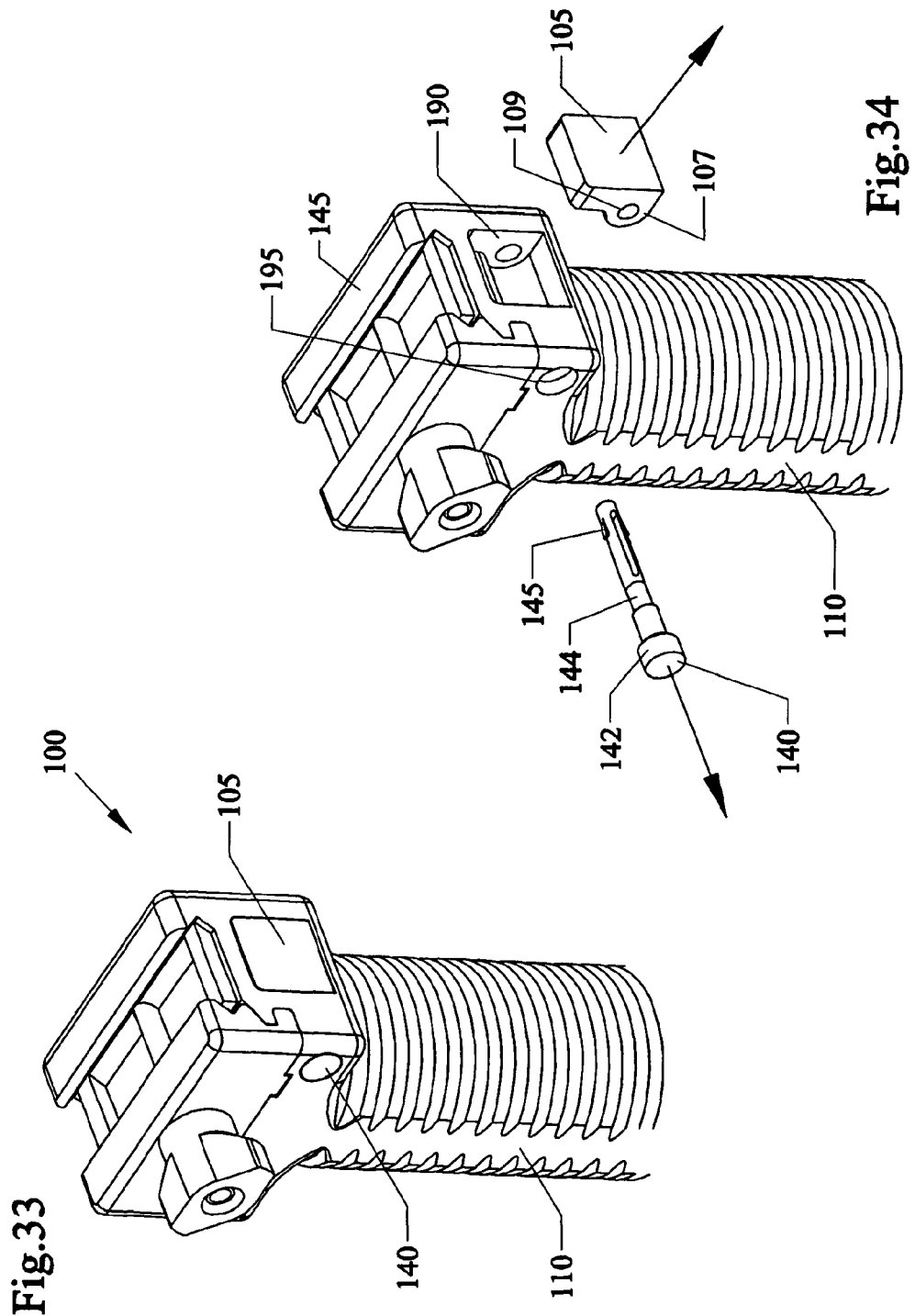

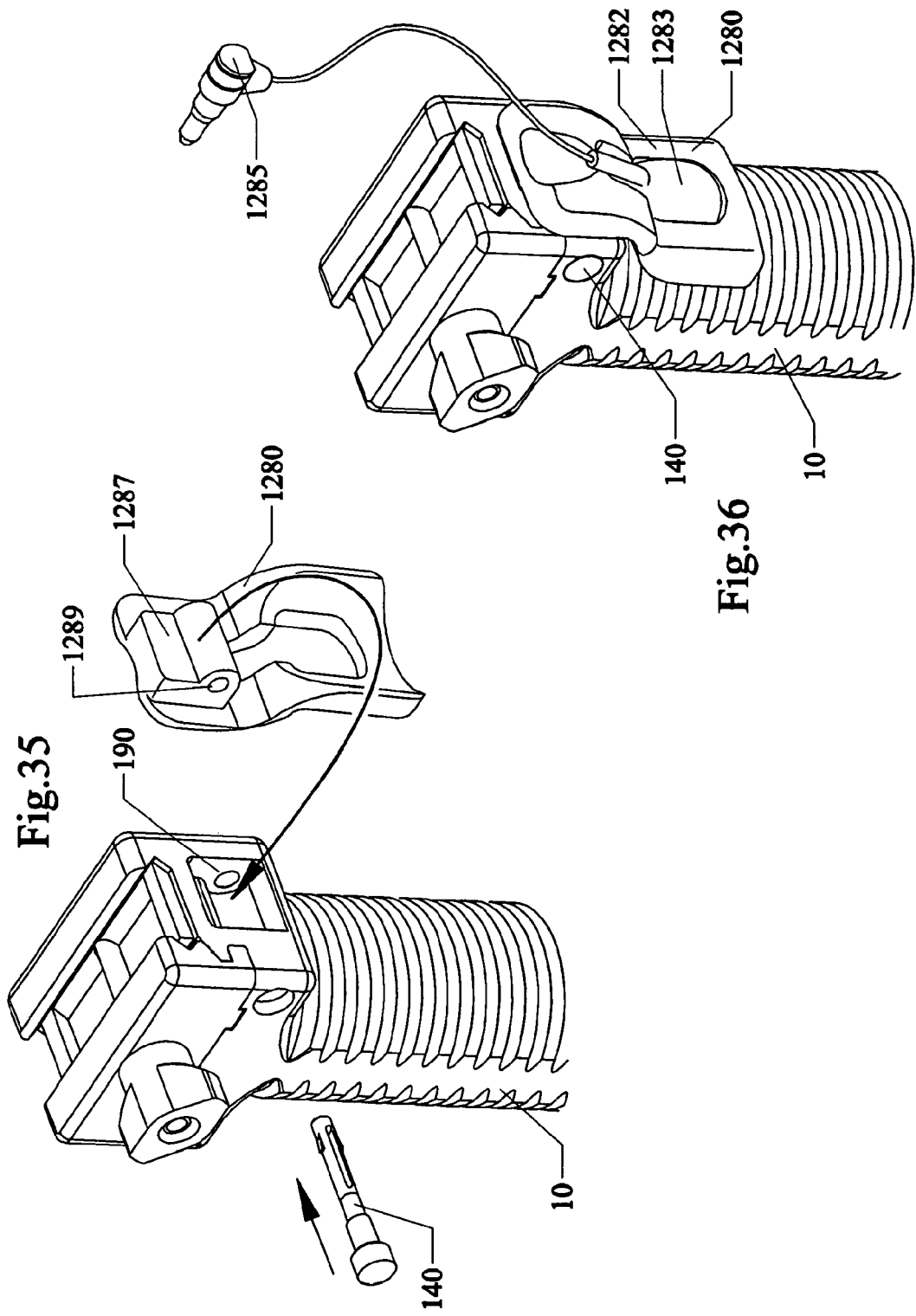

VERTICAL FORE GRIP WITH BIPOD

This invention is a continuation in part of U.S. patent application Ser. No. 10/725,082 filed Dec. 2, 2003 now U.S. Pat. No. 7,111,424, now allowed, and U.S. Design patent application Ser. No. 29/259,347 filed May 5, 2006.

FIELD OF THE INVENTION

The present invention relates to guns and more particularly to devices, systems and methods of using a fore grip/gun handle that combines a pistol grip and a bipod, where the bipod can be concealable and collapsible inside the pistol grip/gun handle.

BACKGROUND AND PRIOR ART

There has been considerable prior art for bipods, and the prior art dates back to pre-20$^{th}$ century times, with bipods having a familiar appearance, structure and configuration.

The known prior art includes U.S. Pat. Nos. 271,251; 1,295,688; 1,355,660; 1,382,409; 1,580,406; 2,386,802; 2,420,267; 2,436,349, and 3,235,997. These patents disclose the respective art in relation to bipods, but do not disclose a fore grip or gun handle with a concealable and collapsible bipod.

The invention includes a replaceable mounting assembly that allows for mounting of the gun handle by various means to a gun. A fore grip or gun handle, designed with ergonomic reasons in mind, provides a stable means of holding the gun. A plurality of legs that are concealed within the fore grip are coupled via a hinge to a spring piston assembly. A spring-loaded fulcrum release mechanism holds the piston assembly in a compressed and locked position. When the piston assembly is released upon activation of the spring-loaded fulcrum release mechanism, the legs are driven downwards by the piston and upon being released from the confinement of the fore grip are deployed outwards to a locked position by a hinge or pivot mechanism. The legs have feet that are designed so that, when the legs are concealed within the handle, the feet seal off the deployment and spreader mechanisms from entrance of any debris, material etc that may interfere with the deployment of the bipod.

A recent U.S. Pat. No. 6,487,807 describes a tripod gun handle that provides a combination pistol grip and pivotal tripod. Close examination of this patent reveals a number of problems with this device, and the most obvious problem is that the tripod legs are positioned on the exterior of the handle when not deployed. If the gun with this device attached was being used in wet or muddy environments, either in a deployed or storage position, the ingress of mud and dirt into and around the handle could result in the deployment and storage of the tripod legs being severely restricted due to the mud or foreign matter. Another problem is that deployment requires the rotation of a disengagement cam to force the legs into their deployed position and then a leg locking assembly is rotated to lock the legs into a locked position. Two separate actions are required to deploy and lock the tripod legs into a locked position.

The fore grip with concealable and collapsible bipod, according to the invention is considerably different from the concepts and designs of the prior art, and provides an entirely new device that provides a combination of a fore grip or gun handle with a concealable and collapsible bipod that opens into an exposed bipod that locks open upon release from the concealment position within the fore grip or gun handle.

SUMMARY OF THE INVENTION

A primary objective of the subject invention is to provide a fore grip/gun handle that combines a pistol grip and a bipod, where the bipod can be concealable and collapsible inside the pistol grip/gun handle.

A secondary objective of the subject invention is to provide a new fore grip or gun handle with a concealable and collapsible bipod having a mounting system for attaching to or coupling to a firearm.

A third objective of the subject invention is provide a new fore grip or gun handle with a concealable and collapsible bipod having a removable gun handle that helps to stabilize the gun when firing occurs.

The disclosed invention, which shall be subsequently described in greater detail, provides a new fore grip or gun handle with a concealable and collapsible bipod that has many advantages of the bipods mentioned previously and has many new and novel features, which result in a new fore grip or gun handle with a concealable and collapsible bipod that has not been suggested, anticipated or even rendered obvious by any of the prior art bipods or the aforementioned tripod gun handle.

The present invention comprises a mounting assembly that may be self-contained or may feature adaptable mounting heads to interface with Weaver or Picatinny Rail mounts or a simple bolt attachment to a firearm. A fore grip is coupled to the mounting assembly, or may be integrated with the mounting assembly, and the fore grip is to be gripped by the hand of a user when the mounting assembly is attached or coupled to a firearm. The fore grip is used for stabilizing the firearm during firing when the user grips the fore grip. A tubular recess consisting of two cylindrical cutouts is positioned within the fore grip or gun handle, and these cutouts serve as the housing for the bipod legs when concealed and as the housing for a sliding piston assembly that deploys the bipod legs.

A plurality of legs can be concealed within the fore grip or gun handle and is coupled to a sliding piston assembly that is also concealed within the handle. A catch system that protrudes from the sliding piston assembly is attached to the sliding piston assembly and interfaces with a spring-loaded fulcrum release mechanism positioned at the top of the handle. A cutout within the top of the handle provides a housing for the release mechanism.

A compression spring can be positioned between the sliding piston assembly and the bottom of the first cylindrical cutout and this spring, when under expansion, drives the sliding piston assembly downward toward the bottom of the fore grip. At the bottom of the fore grip, a recessed locking ring or plug is secured by threads into the fore grip, and is positioned to prevent the sliding piston assembly from overtravel and thus exiting the fore grip. The legs are connected to the bottom of the piston via a hinge or pivot point, and when the legs are released from confinement within the fore grip, the legs expand outwards until fully deployed.

Another preferred version of the invention includes an ergonomic fore grip for mounting to a firearm to stabilize the firearm, that has a top end and a bottom end with an opening there through, a mount for attaching the top end of the fore grip to a firearm, a pair of legs having an upper hinged end and a bottom end, a catch member that holding the legs in a closed position substantially inside the fore grip, a switch for releasing the catch member and allowing the bottom end to slide out from the opening in the fore grip, and an expansion spring positioned between the legs for causing the legs to pivot outward relative to the hinged end so that the legs expand outward in a triangular configuration.

The fore grip can include a generally cylindrical handle with a stacked configuration of grooves and elongated vertical flat surface edges on opposite sides of the handle.

The switch can be a flush mounted button with a serrated face. The switch can be a recess mounted button with a serrated face.

The switch can be a depressible button having a catch portion that interlocks with a catch member adjacent to the hinged end of the legs, wherein depressing the button causes the catch portion to release the catch member allowing the legs to drop out from underneath the fore grip. Behind the switch can be a spring for pushing an outer face of the button to expand outward from a side of the fore grip.

The expansion spring in the fore grip can include a torsion spring having each end abutting against an upper inner surface of each leg.

The fore grip can include a generally cylindrical handle for housing the pair of legs with the hinged end, the catch member, the switch and the expansion spring, a screwable cap for covering a bottom opening on the handle having an opening smaller in diameter than the opening in the handle, wherein the cap permits and limits the sliding of the legs from underneath the handle when the legs are deployed.

The handle can include a void space or female orifice to hold an accessory switch such as but not limited to a depressible switch, for activating an accessory unit, such as but not limited to a light. A cap cover can cover the void space or female orifice. A tension fit pin can hold the cap cover in place.

Each of the legs can include telescoping legs to allow adjustment of the leg lengths for uneven terrain. Each of the legs can include integral molded angled feet formed with a hollow backside and metal reinforcement member.

The mount on the fore grip can include members for clamping the fore grip to a weapon, and a screwable member for fastening the rail members about a portion of the weapon.

The fore grip can also include a second spring for causing the legs to drop below the fore grip.

The legs can also drop from fore grip by gravity. Alternatively, inertial actuation (jerking or flipping the fore grip) can result in the legs being deployed downward and then expanded out by an expansion spring.

A novel method of actuating a leg stand from the fore grip on a weapon can include the steps of attaching a generally cylindrical fore grip handle with irregular side surfaces as a fore grip to a weapon, depressing a button located on an upper side surface of the handle, releasing a catch member that supports a pair of hinged legs by the depressing of the button, dropping foot ends of the legs from underneath the handle, and expanding the pair of legs outward relative to the hinged end as the legs leave the handle to a deployed position.

The step of dropping can be by the expanding of a spring against an upper portion adjacent of the hinged ends of the legs in downward direction.

The step of dropping can be by releasing the legs downward gravity. Alternatively, inertial actuation (flipping and jerking motions) can result in the legs dropping out from the fore grip. Also, physically pulling the legs downward after the side switch is activated can be done.

Further objects and advantages of this invention will be apparent from the following detailed description of a presently preferred embodiment, which is illustrated in the accompanying flow charts and drawings.

BRIEF DESCRIPTION OF THE FIGURES

Referring particularly to the drawings for the purposes of illustration only, and not limitation:

FIG. 3 is a cross-sectional view of an embodiment of the invention showing the fore grip with the legs in a stored position.

FIG. 4 is a cross-sectional view of an embodiment of the invention showing the fore grip with the legs in a deployed position.

FIG. 5 is an exploded view of an embodiment of the invention.

FIG. 14 shows the fore grip of FIG. 6 attached to a rail of weapon with legs up.

FIG. 15 shows the fore grip attached to a rail of weapon with legs down.

FIG. 16A is a cross sectional view of FIG. 15 with the fore grip apart from the weapon.

FIG. 16B is another cross-sectional view of FIG. 15 with fore grip attached to weapon.

FIG. 33 is a rear perspective enlarged upper view of the preceding fore grip showing accessory mounting bay plug.

FIG. 34 is another view of the upper portion of the fore grip of FIG. 33 showing the mounting bay plug and friction pin removed.

FIG. 35 is another view of FIG. 33 of an accessory switch and friction pin to install.

FIG. 36 is another view of FIG. 35 showing accessory switch and friction pin installed.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

It would be useful to discuss the meanings of some words used herein and their applications before discussing the fore grip device of the present invention and method of using the same.

Figure 1:
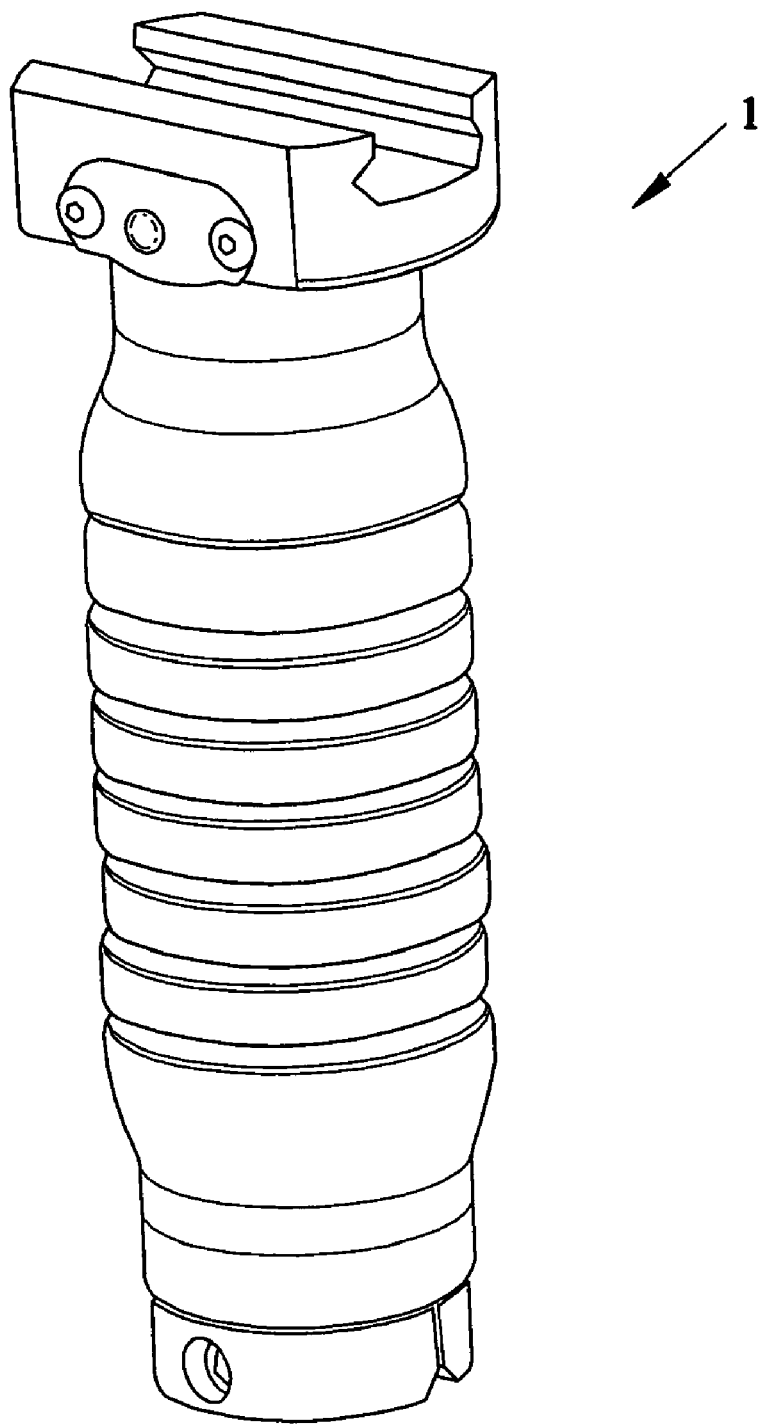
FIG. 1 is an elevational view of an embodiment of the invention showing the fore grip with the legs in the stored position.
Figure 2:
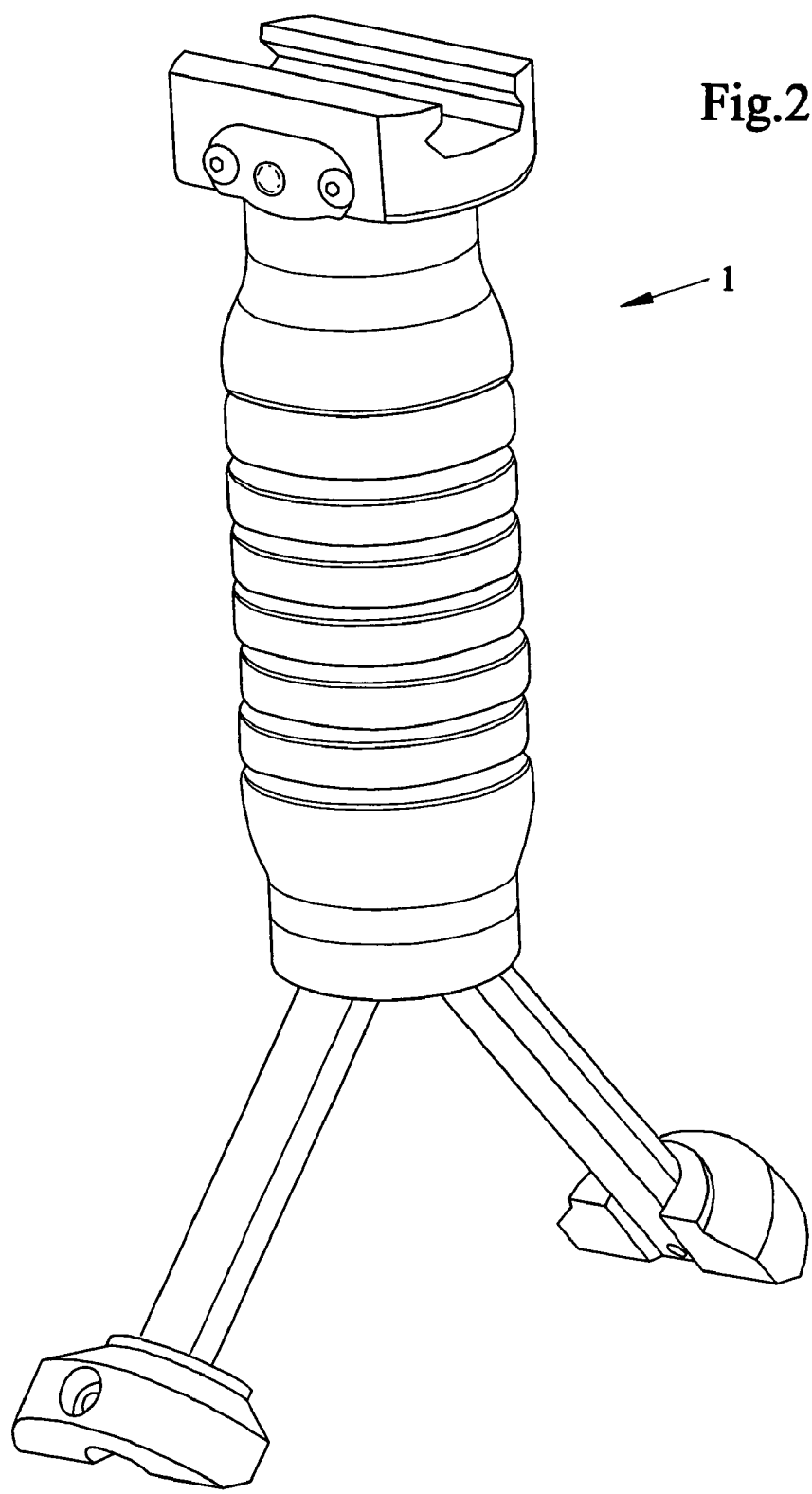
FIG. 2 is an elevational view of an embodiment of the invention showing the fore grip with the legs in the deployed position.

As illustrated FIGS. 1 through to 5, the fore grip 1 with concealable and collapsible bipod consists of four distinct and separate assemblies, and these are the fore grip, the piston assembly, the legs, and the release mechanism.

The fore grip consists of a fore grip with a mounting section or end 3 that is designed for attachment to a gun. The fore grip may consist of a machining or a casting that utilizes aluminum or a molding that utilizes high impact resistant polymer or a composite material. The fore grip section 2 has a mounting end 4 that allows for coupling or attachment to a firearm. The fore grip is a grip designed for gripping by the hand of a user when the fore grip 1 is attached to a fire arm. Although FIGS. 1 through 5 show the mounting end 3 being an integral part of the handle for illustration purposes only, it should be understood that the mounting end 3 may be a separate component that is then attached by known means, such as threads or a lock screw or locking bolt to the handle 1. For illustrative purposes, the mounting end 3 is shown with a cut out profile 4 that enables mounting of the handle 1 to a firearm via the use of a Picatinny mounting rail (MIL-STD-1913 rail), a mounting system widely used by military for attachment of various devices to military rifles. However, it should be understood that other means of attachment to a firearm could be used.

The fore grip 2 has a plurality of annular grooves 5 around the circumference of the fore grip section 2 and these grooves 5 are designed to aid in improving the gripping of the fore grip section 2. These grooves 5 are positioned on approximately two-thirds of the fore grip section 2 and if fore grip 1 is fabricated from aluminum, these grooves 5 may assist in reducing the weight of the gun handle. Although seven annular grooves are shown in FIGS. 1 through 5, this is for illustrative purposes only, and the number of grooves may vary.

The base or bottom 6 of the fore grip section 2 has a recessed locking ring 7 or stop ring that is shown secured to the fore grip section 2 by threads though it should be understood that other means of securing, such as a press fit or a chemical locking compound, may be used in place of threads. The recessed locking ring 7 fits into a recess or cutout 8 at the base of the handle section 2 and a further recess or cutout 9 is provided for the feet 13 of the bipod legs 12 when in the stored position. The recessed locking ring 7 has a cylindrical hole 10 that has two functions. Hole 10 allows for the passage of the bipod legs into the body of the handle section 2 when the bipod legs are stored in the handle section 2 and also allows for the passage of the piston 17 when the bipod legs are deployed. The recessed locking ring 7 also has a tapered or counter-sunk recess 11 that enables the feet 13 of the bipod to fit inside the handle 2 when the bipod legs 12 are in the stored position. An o-ring (not shown) is used in conjunction with the recessed locking ring 7 to dampen the sound of the piston when it comes into contact with the recessed locking ring. A series of cut outs (not shown) are machined into the end of the recessed locking ring 7 to enable a wrench being used to tighten up the locking ring upon assembly of the piston and legs into the fore grip.

An encapsulated ring is an alternate technique for securing the legs within the first cylindrical cutout for housing and permits and limits the sliding of the piston assembly when the legs are deployed.

The fore grip has a internal tubular recess 14 consisting of two cylindrical recesses 15 and 16 that are positioned within the fore grip or gun handle, and these recesses serve as the housing for the bipod legs when concealed and as the housing for a sliding piston assembly that deploys the bipod the bipod legs, and for the catch or male part 36 of the spring-loaded fulcrum release mechanism 35. Cylindrical recess 15 is used for the housing for the sliding piston assembly and the bipod legs while cylindrical hole 16 is used for the passageway of the catch or male part 36 of the spring-loaded fulcrum release mechanism 35. Cylindrical recess 15 also has two recesses or longitudinal grooves 28 and 29 (only 28 is shown in FIG. 4) that are positioned 180 degrees apart from each other and extend upwards from the base or bottom 6 of the fore grip. The recesses 28 and 29 extend for the entire length of the cylindrical recess 15. It should be understood that for descriptive and illustrative purposes two recesses or longitudinal grooves are detailed and disclosed, but at least one recess or longitudinal grooves are detailed and disclosed, but at least one recess or longitudinal groove may be used.

The piston assembly 17 consists of three sections, these being the piston head 18, the piston shaft 19, and the spring 20. The piston head 18 has two lugs 21 and 22 that protrude outwards from the piston head and these lugs are 180 degrees apart from each other. The hinge coupling lugs 23 and 24 protrude downwards from the piston head 18 and are positioned 180 degrees apart from each other. Both hinge coupling lugs 23 and 24 have a cylindrical hole 25 for a locking pin 26 that secures the bipod legs to the hinge coupling lugs 23 and 24, thus forming a hinge point 27.

The two lugs 20 and 21 protruding outwards from the piston head 18 interface with the two recesses or longitudinal grooves 28 and 29 that are part of the tubular recess 14. The lugs 20 and 21 fit within the two recesses 28 and 29 and ensure that the piston 17 does not rotate around the center axis of the tubular recess 14 when the bipod is deployed by the piston being driven downwards upon expansion of the spring 20 and when the piston 17 is in the closed position and the bipod is not deployed. It should be understood that for descriptive and illustrative purposes two protruding lugs are detailed and shown for interfacing with two longitudinal recesses or grooves, but at least one lug may be used to interface with at least one recess or longitudinal groove. It should also be understood that other means of prevention of rotation of the piston around the center axis of the tubular recess may also be used as is known, and this may include tubular recess 15 being provided with at least one longitudinal protrusion that interfaces with at least one corresponding recess on the piston head 18 thereby preventing rotation of the piston upon deployment of the legs and when the piston and legs are in the stored position.

The bipod legs 12 consist of two legs 12*a* and 12*b* with two feet 13 that are shown attached to the legs by known means, such as screws but it should be understood that the feet may also be integral with the legs. For illustration purposes, the legs are shown with a half-moon or half-round shape, with the flats facing each other, and it should be understood that other profiles or lengths, such as triangular, may be used. At the bottom of each leg 12*a* and 12*b*, a hole 12*c* and 12*d* is positioned for securing or attaching of the feet 13, though said holes may be eliminated if other means of securing or attaching are used.

The two feet 13*a* and 13*b* are of a half-moon or half round shape at the base of the feet, and have an external tapered section that interfaces with the recess 11 of the recessed locking ring 7. The two feet also have a recess 13*c* and 13*d* to allow the legs 12 to fit into, and a transverse whole 13*e* and 13*f* for, in this instance, a locking screw. Other means of securing or attaching to attach the feet to the legs may be used, such as welding or dovetail cuts or pins. The thickness of the feet may be varied to compensate for the difference in the height of the fore grip when attached to different guns. If the feet are integral with the legs, known means such spacer elements may be attached to vary the length of the legs to compensate for the difference in height of the fore grip when attached to different guns.

The hinge point 27 consists of a left and right hinge pivot (not shown) that is machined into the top of the legs 12*a* and 12*b*, and each pivot is 180 degrees apart. A coil spring (not shown) is positioned between each of the legs 12*a* and 12*b*, and is secured by the locking pin 26. On the inside of the legs 12*a* and 12*b*, a small recess is machined to seat the spring in each of the two legs.

At the top of the fore grip or mounting end 3, a spring-loaded fulcrum release mechanism 35 is positioned within a transverse recess 37. Transverse recess 37 is positioned so that it crosses cylindrical hole 16. The spring-loaded fulcrum mechanism 35 consists of a fulcrum latch plate 38, a spring 39, a tension plate 40, and two screws 41 and 42 that secure and retain the tension plate to the fore grip. On one side of the fore grip at the mounting end, a rectangular recess with rounded ends 43 is machined into the fore grip to match the shape of the tension plate. The fulcrum latch plate 38 consists of a rectangular plate with a beveled cut out that serves as the catch surface for the catch or male part 36 of the spring-loaded fulcrum release mechanism. The male part 36 of the spring-loaded fulcrum release mechanism is shown for illustration purposes to be a round-headed bolt, though other known forms may be used. The male part 36 is secured or fixed into the top of the piston shaft 19 and it should be understood that for illustration purposes, male part 36 is shown being retained in the piston shaft 19 by threads but various other means of securing such as a press fit or welding may be used.

To use the fore grip, a user simply attaches the fore grip to the gun, regardless of whether or not the bipod legs are deployed. If the legs are deployed, then the user has the option of using the gun with the legs deployed or compressing or squeezing the legs together, and pushing them upwards into the fore grip until the male part of the spring-loaded fulcrum release mechanism catches and locks the bipod legs and the piston assembly into the closed position. One does not need to rotate any locking rings to either lock the legs in the closed position or release the legs from the closed position. It is simply a matter of depressing the tension plate to release the piston assembly and allow the bipod legs to move downwards and deploy upon the piston reaching the end-of-travel position. The spring mechanism within the hinge point ensures that the legs are expanded outwards and are thus deployed.

ERGONOMIC EMBODIMENTS

A list of the components in FIGS. 6-42 will now be described
100. Fore grip embodiment
105. accessory mounting bay plug
107. side connection tabs on plug
109. through-holes in side tabs
110. Fore grip handle.
115. Inside cavity walls
116. ceiling surface
118. Bottom open end of handle
120. Leg(s).
122. upper end of leg 120
123. leg axle tab
124. Upper inner surface of leg
126. Bottom of leg
128. Foot on leg.
130. Retainer cap.
132. Inner threads
135. hole in cap
140. Friction pin.
145. Head piece
146. Inside wall for spring 1130
148. Cut-out in head piece
150. Actuator slide button.
150B. Grooved outer face end of button
152. Inner end of button
154. shaft of button
155. elongated hole inside shaft
156. raised side rails on shaft
157. cut-out cavity underneath shaft
160. Removable Rail clamp.
162. Left raised ridge
164. Right raised ridge
168. Fixed Rail
170. Rail clamp nut with knob head
175. Rail clamp pin.
180. Rail clamp bolt.
190. Accessory mounting bay.
195. through-holes in side walls of bay
105. Accessory mounting bay plug.
1110. cylindrical leg yoke.
1112. Raised cylindrical walls of leg yoke
1116. Parallel Extending Leg tabs
1117. Axle Holes for leg pivot pin 1160
1118. stiffening brace
1120. Yoke compression spring.
1122. Lower end of spring
1128. Upper end of spring
1130. Actuator compression spring.
1140. Leg torsion spring.
1142. First outer end of spring 1140
1148. Second outer end of spring 1140
150. Actuator slide pin.

1160. Leg pivot pin.
1170. Weapon.
1180. Mounting rail.
1190. Grip Pod assembly.
1200. Stainless steel leg stiffening insert.
1210. Plastic molded leg.
1220. Actuator pawl (a feature of item 150).
1230. Side protruding portion of 1234
1234. Leg yoke pawl (a feature of item 1110).
1240. Yoke guide slot (a feature of item 1110).
1250. Yoke guide rail (a feature of item 110).
1260. Actuator travel to release leg/yoke assembly.
1270. Leg/yoke assembly travel after release.
1280. Accessory switch.
1290. Extendable leg.

Retracted Position

Figure 6:
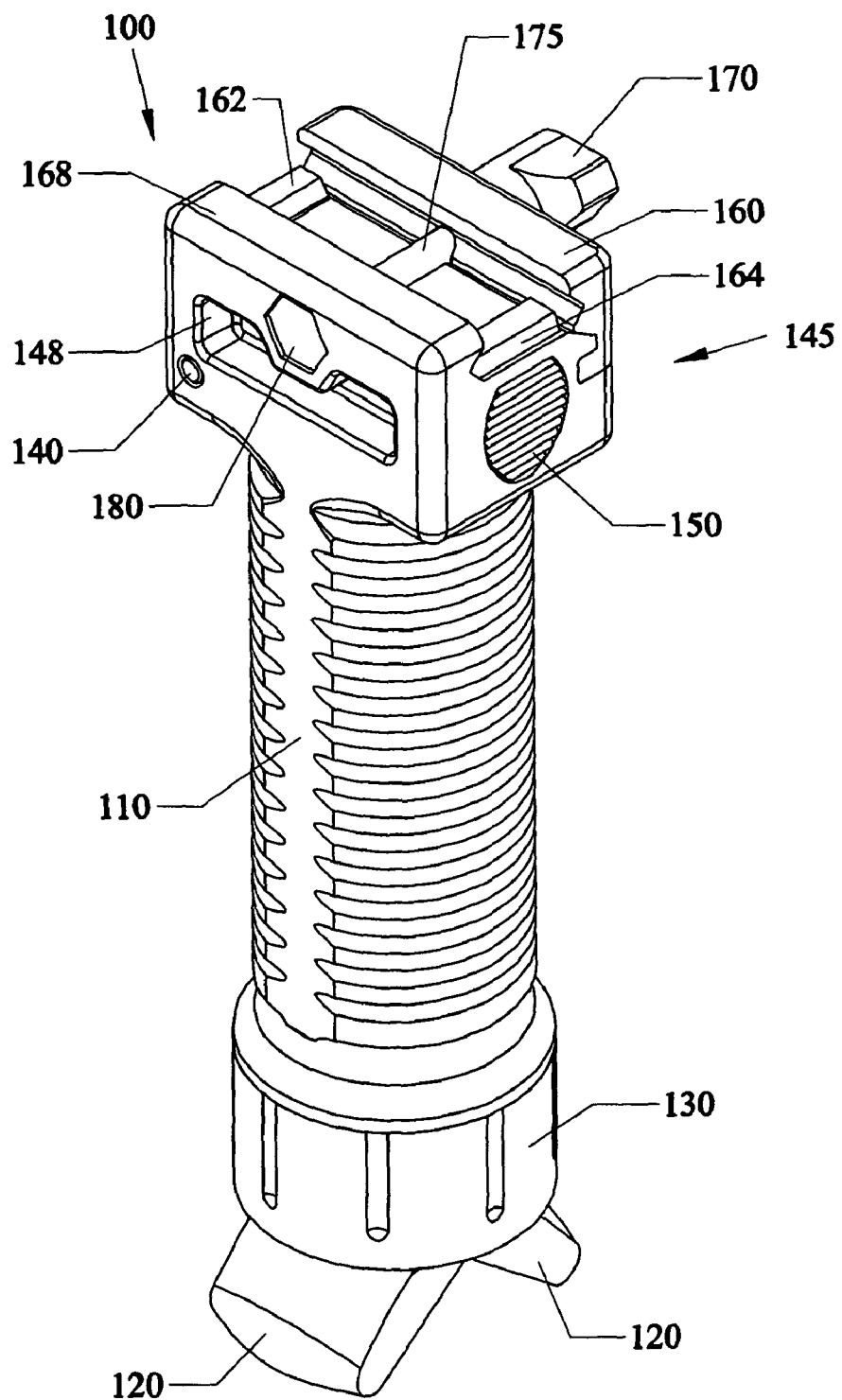
FIG. 6 is a front perspective view of another embodiment of the fore grip with legs up.
Figure 7:
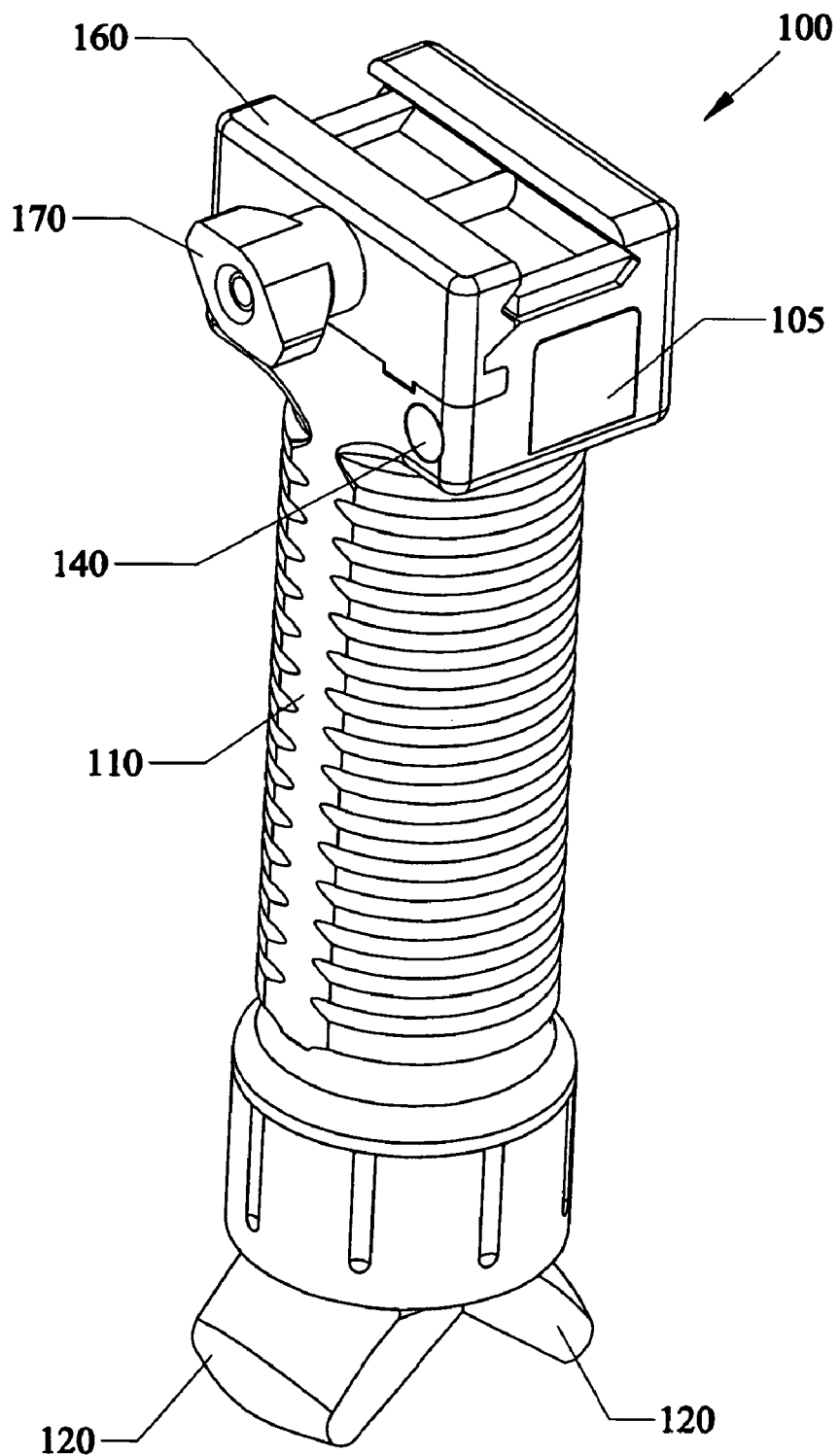
FIG. 7 is a rear perspective view of the fore grip of FIG. 6.
Figure 8:
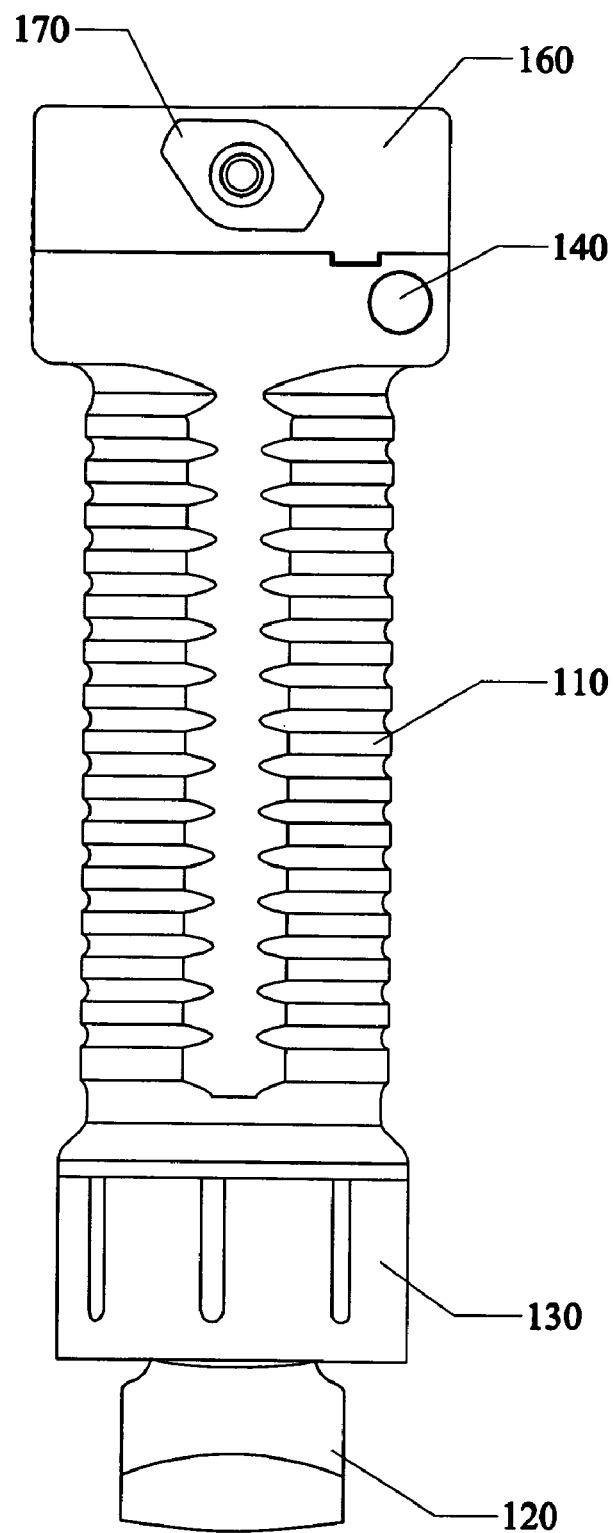
FIG. 8 is a rear planar view of the fore grip of FIG. 6.
Figure 9:
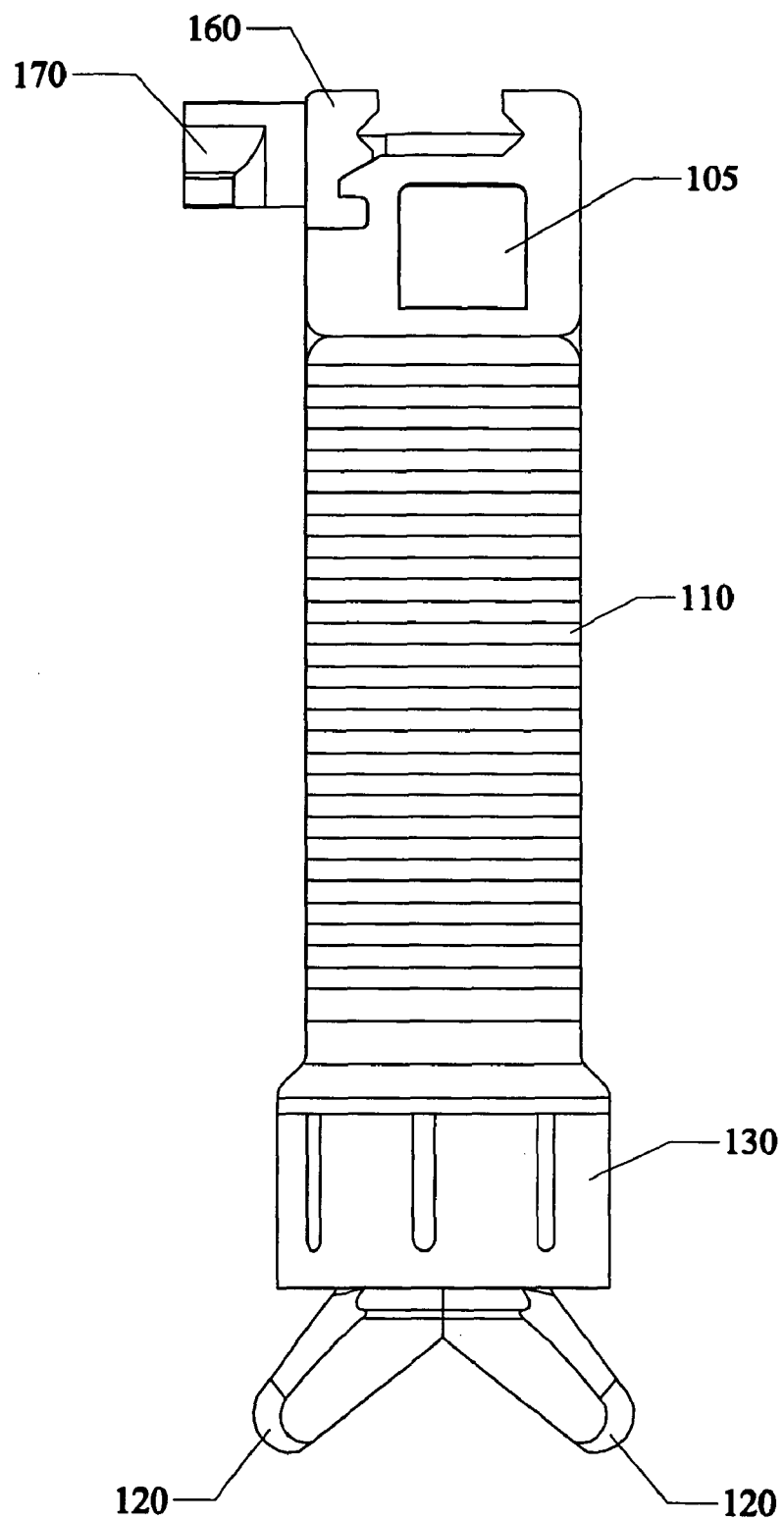
FIG. 9 is a left side view of the fore grip of FIG. 6.
Figure 10:
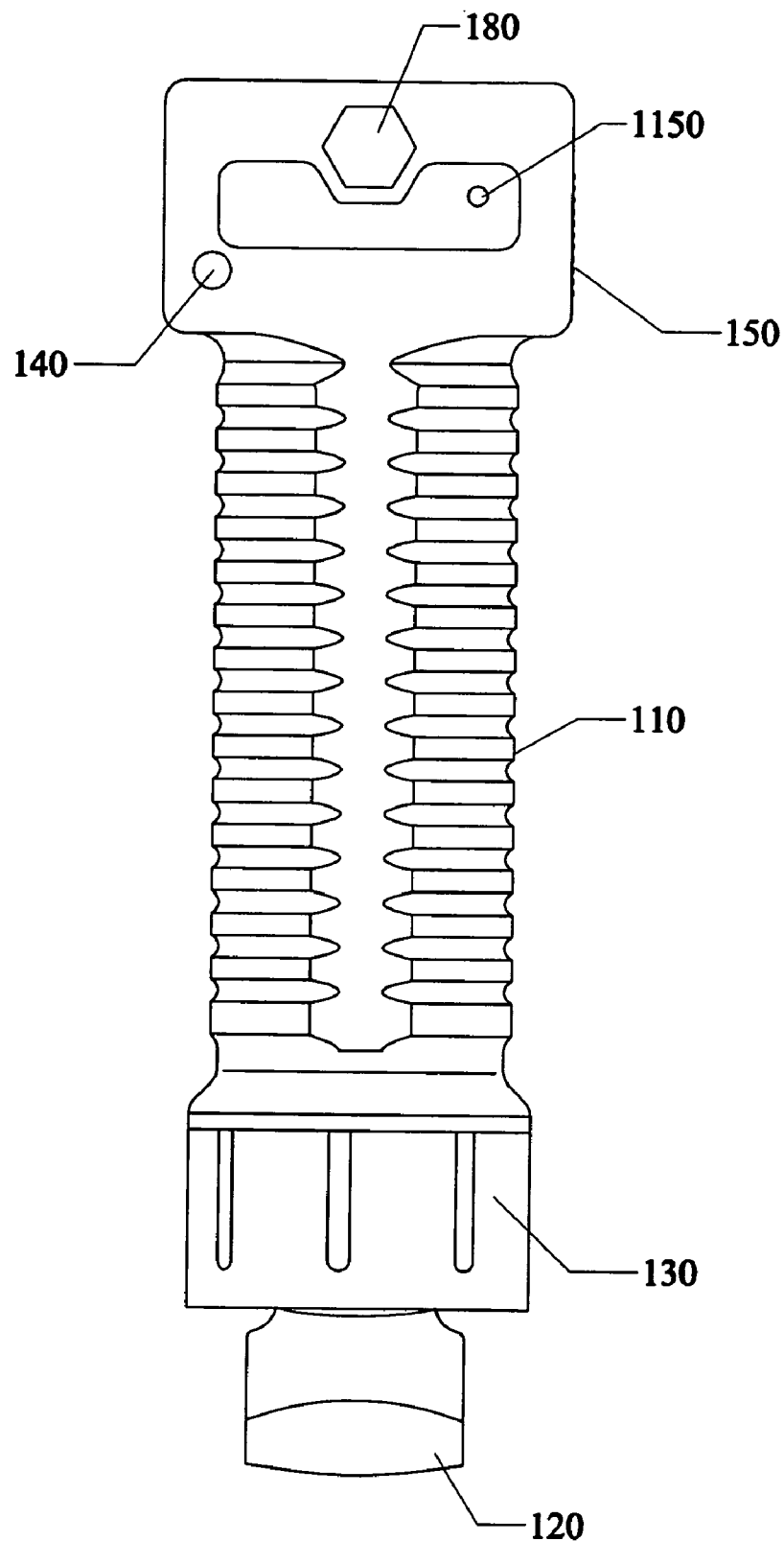
FIG. 10 is a front planar view of the fore grip of FIG. 6.
Figure 11:
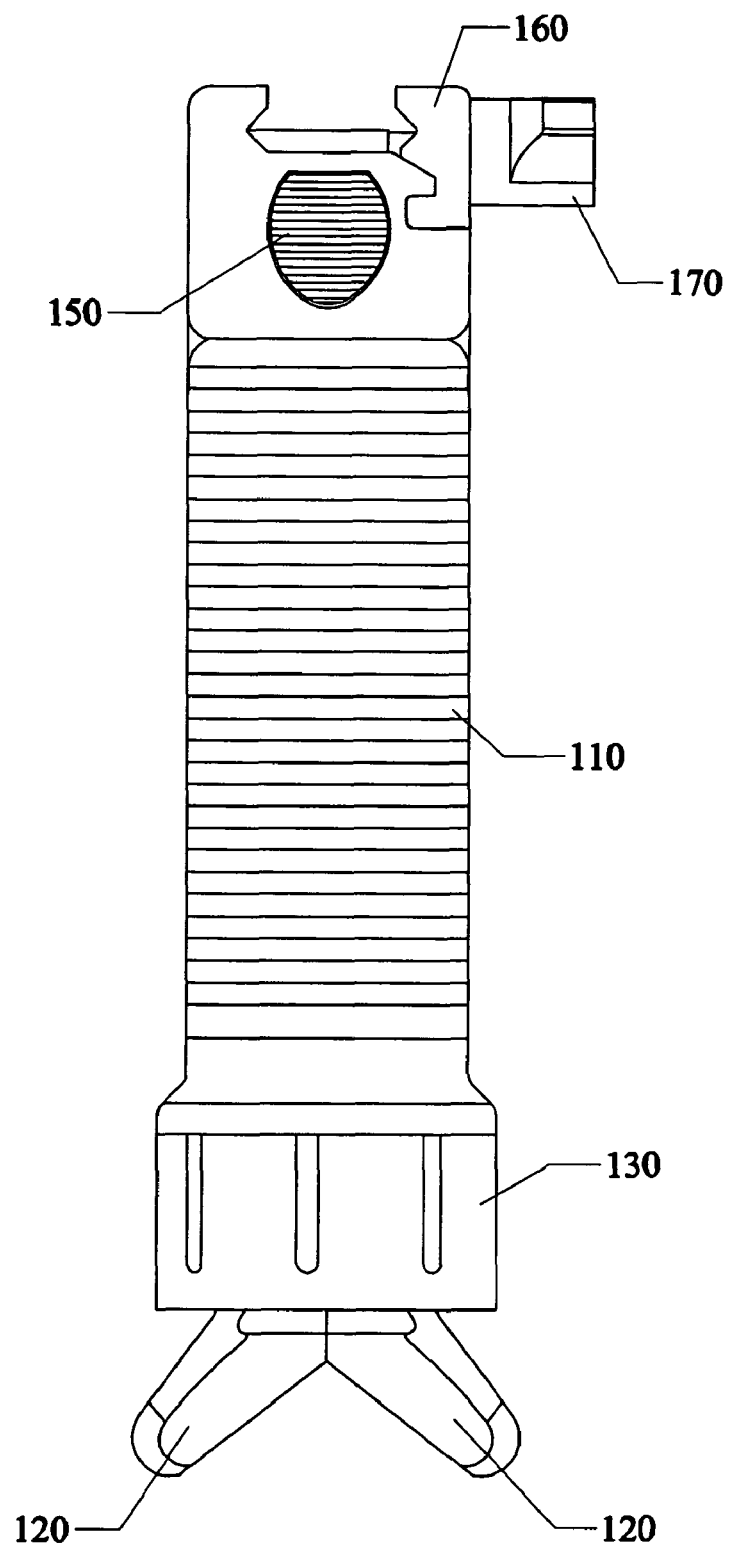
FIG. 11 is a right side view of the fore grip of FIG. 6.
Figure 12:
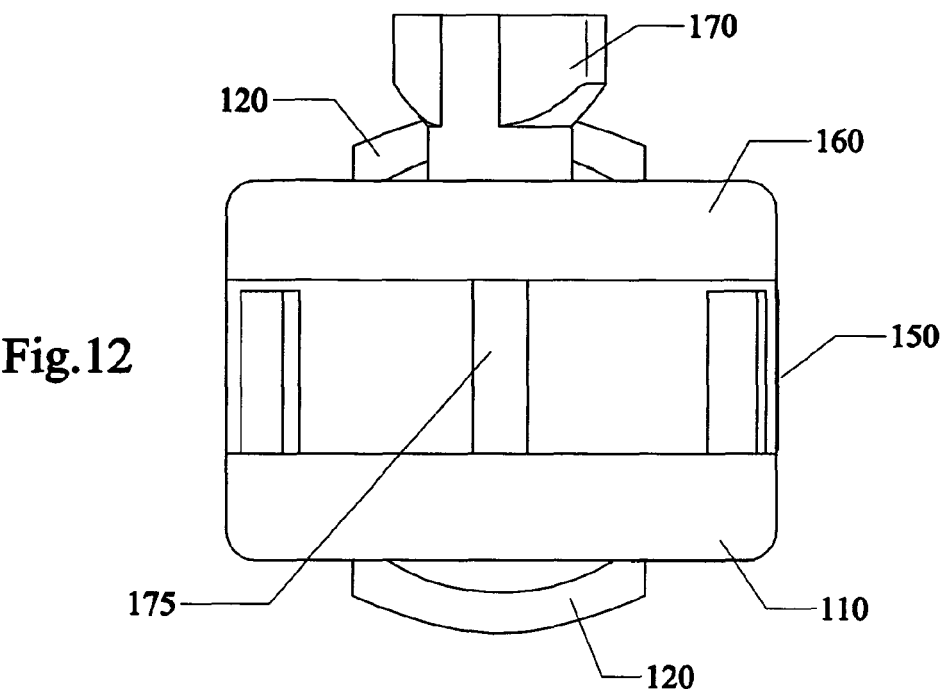
FIG. 12 is a top view of the fore grip of FIG. 6.
Figure 13:
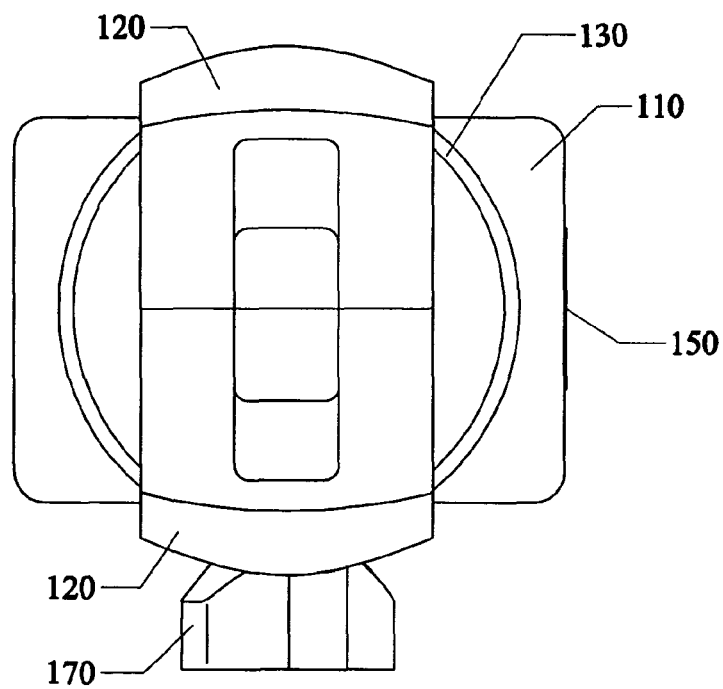
FIG. 13 is a bottom view of the fore grip of FIG. 6.

Initially, the novel fore grip 100 can be attached to a weapon with the legs 120 in a retracted position inside handle 110. FIG. 6 is a front perspective view of another ergonomic embodiment of the fore grip 100 with legs 120 in up positions. FIG. 7 is a rear perspective view of the fore grip 100 of FIG. 6. FIG. 8 is a rear planar view of the fore grip 100 of FIG. 6. FIG. 9 is a left side view of the fore grip 100 of FIG. 6. FIG. 10 is a front planar view of the fore grip 100 of FIG. 6. FIG. 11 is a right side view of the fore grip 100 of FIG. 6. FIG. 12 is a top view of the fore grip 100 of FIG. 6. FIG. 13 is a bottom view of the fore grip 100 of FIG. 6. FIG. 14 shows the fore grip 100 of FIG. 6 attached to a rail 1180 of weapon 1170 with legs 120 in up positions.

Referring to FIGS. 6-14, the fore grip 100 includes two parallel legs 120 retracted in an up position inside fore grip elongated handle 110, which will be described in greater detail later on. Handle 110 can be a generally elongated cylindrical shape with opposite facing flat sides and stacked ring grooves that give the user an ergonomic grip.

A retainer cap 130 can be screwed onto the bottom of handle 110 to hold the inner components from completely separating out from the handle 110. The top of the handle 110 can have a molded generally rectangular head piece 145 with a cut-out side section 148 that can reduce the weight of the fore grip 100 on a front side.

On top of the head piece 145 can be a fixed rail 168, and a removable rail clamp 160 with a mounting cavity space therebetween with a left raised ridge 162 and right raised ridge allowing for the cavity space to remain fixed when the knob/nut is tightened against a threaded end of a rail clamp pin 175 of the rail clamp bolt 180 that latter of which can be countersunk into the side of fixed rail 168.

Referring to FIGS. 1-14, the head piece 145 further includes a friction pin 140 holds an accessory mounting bay plug in place, and will be described later in reference to FIGS. 33-36.

The head piece 145 includes an actuator slide button 150 which is used to release the legs 120. The face of the button 150B can have a serrated surface or grooved surface that aids the user to find and depress the button activation by feeling the irregular surface. In addition, the button face 150B can be recessed to the outer surface of the head piece of by flush mounted in order to avoid accidental deployment of the legs 120.

Attaching the Fore Grip

FIG. 15 shows the fore grip 100 attached to a rail 1180 of weapon 1170 with legs 120 fully deployed down and expanded outward after the button 150 has been depressed. FIG. 16A is a cross sectional view of FIG. 15 with the fore grip 100 apart from the weapon 1170. FIG. 16B is another cross-sectional view of FIG. 15 with fore grip 100 attached to weapon 1170.

Referring to FIGS. 15, 16A and 16B, a weapon 1170 such as but not limited to an automatic or semi-automatic rifle, and the like. On the bottom of the weapon 1170 can be mounting rail 1180 that can have inwardly inclined sides. The head piece 145 of a is fully deployed fore grip 11190 can be fit over the mounting rail 1180 underneath the weapon 1170, and the clamp knob/nut 170 can be screwed so that the indented inner walls of the moveable rail clamp moves sandwiches the weapon mounting rail 1180 against the fixed rail 168 locking the deployed fore grip 1190 to the weapon 1170. The head piece 145 and rails 1180 and rail clamp can have long rectangular dimensions for added strength when mounting the fore grip to a weapon.

As shown in FIG. 14, the fore grip can be attached to the weapon 1170 without being deployed. The attachment process described above can be accomplished while the legs 120 are in a retracted position.

Deployed Position

Figure 17:
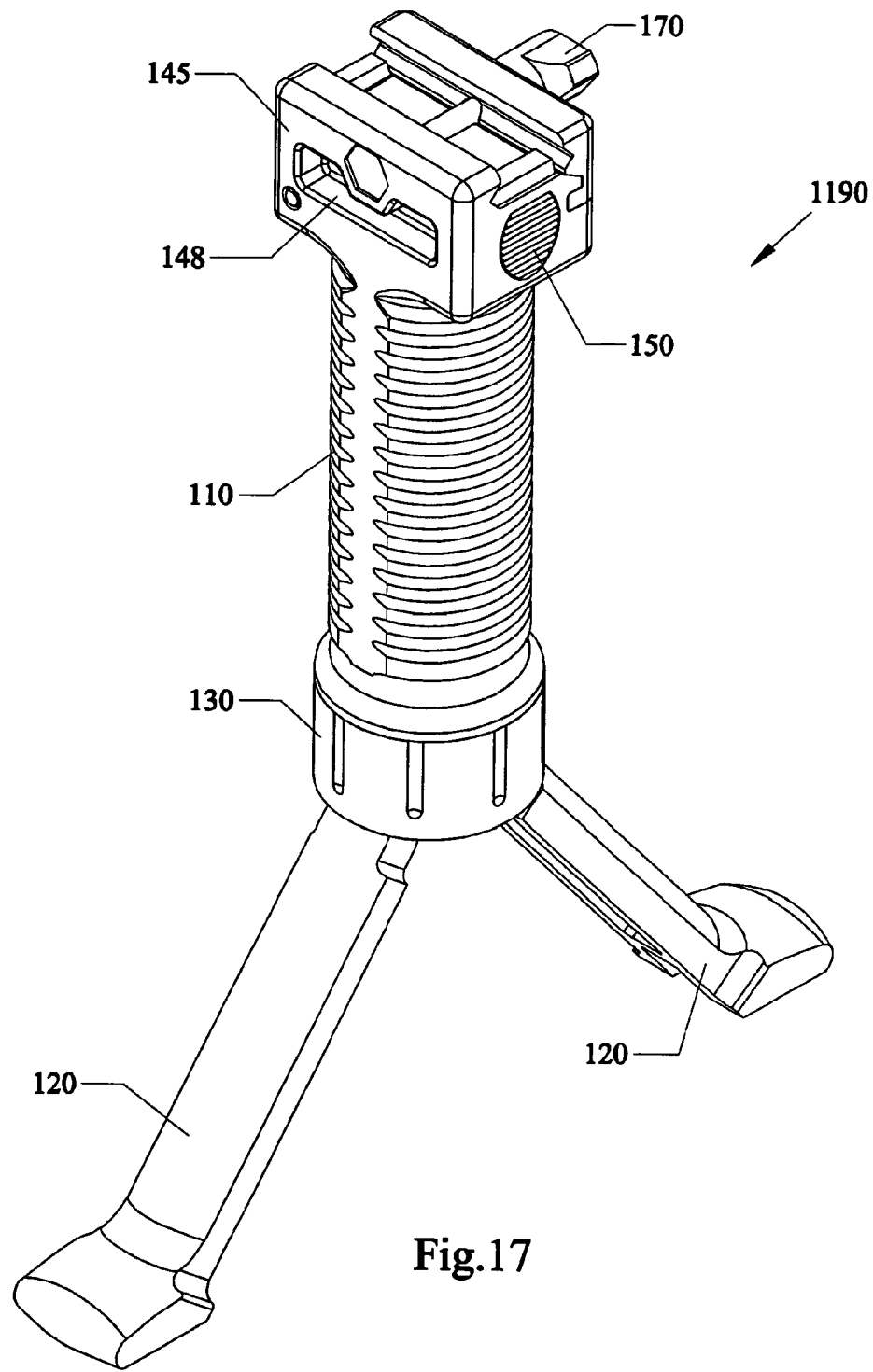
FIG. 17 is an upper left front perspective view of fore grip of FIG. 6 with legs down.
Figure 18:
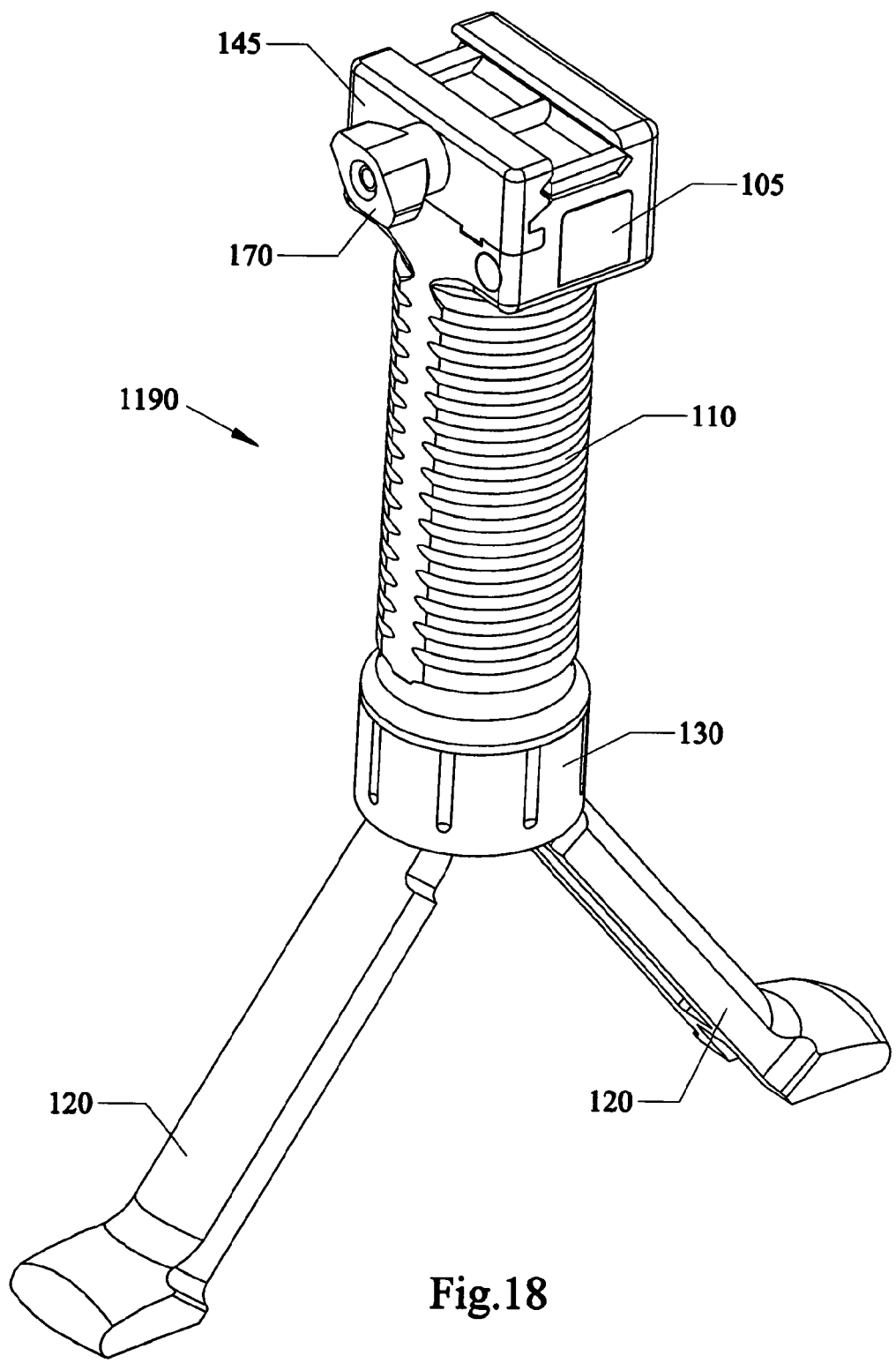
FIG. 18 is an upper left rear perspective view of FIG. 17.
Figure 19:
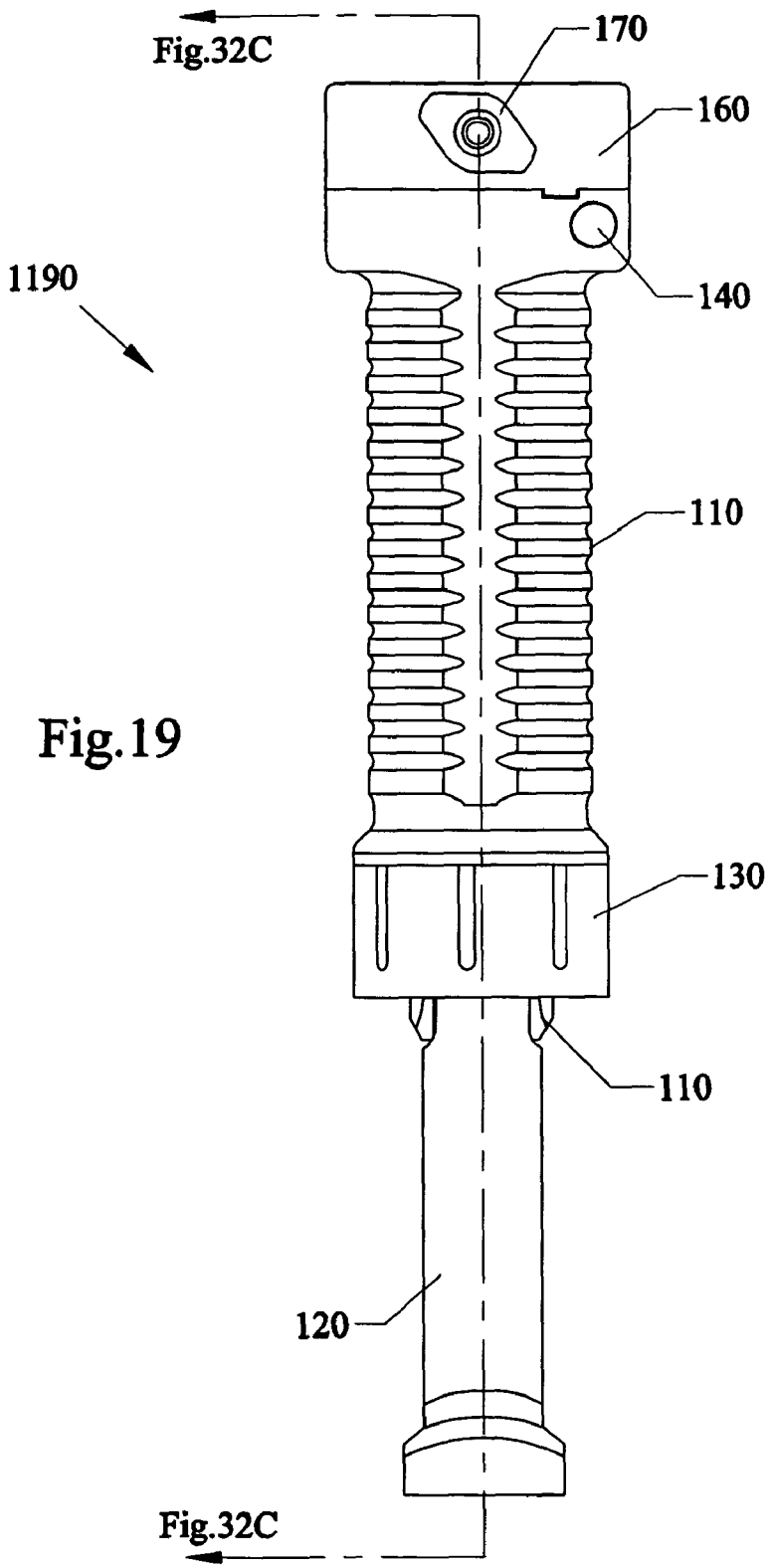
FIG. 19 is a rear planar view of FIG. 17.
Figure 20:
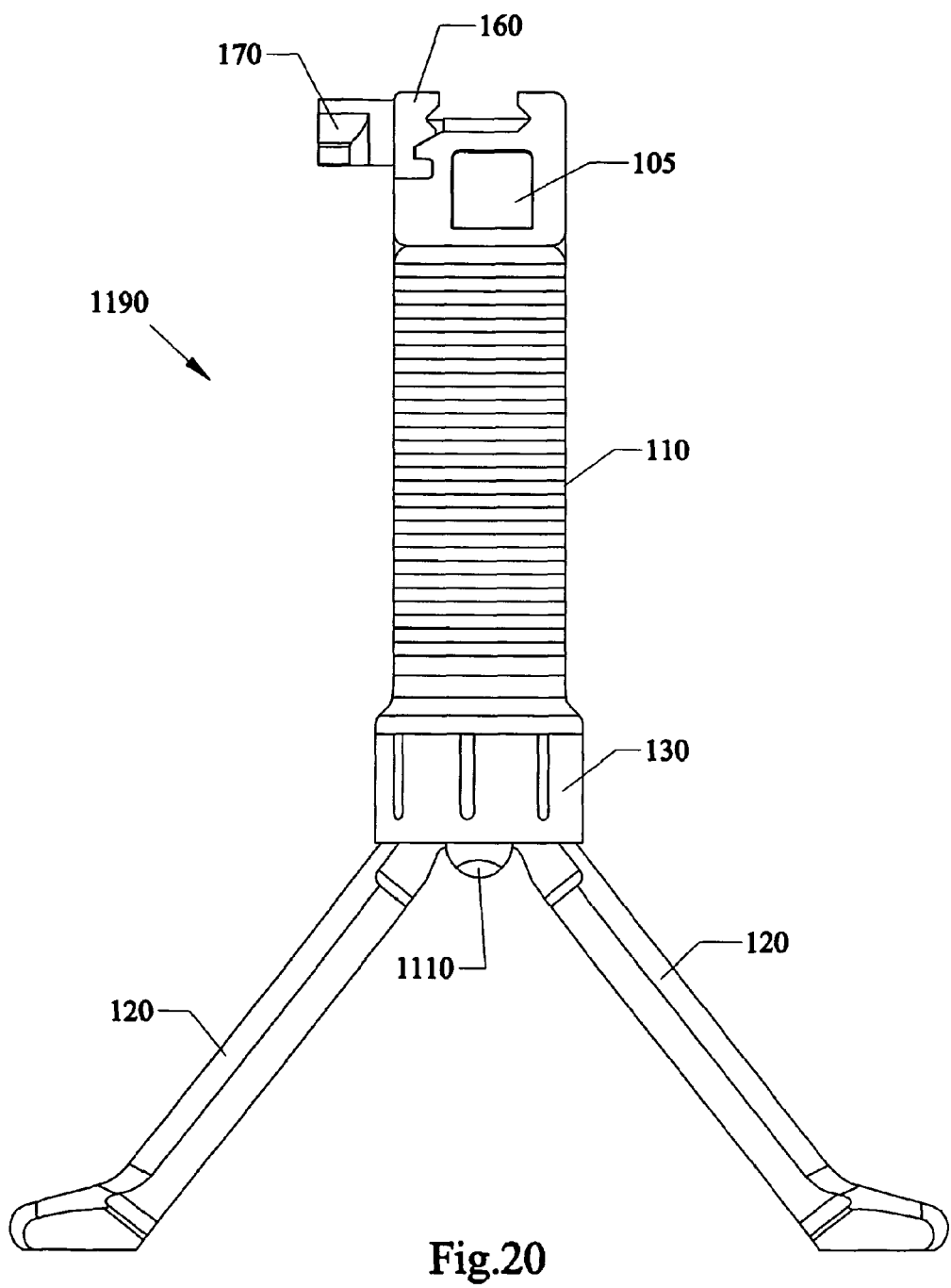
FIG. 20 is a left side view of FIG. 17.
Figure 21:
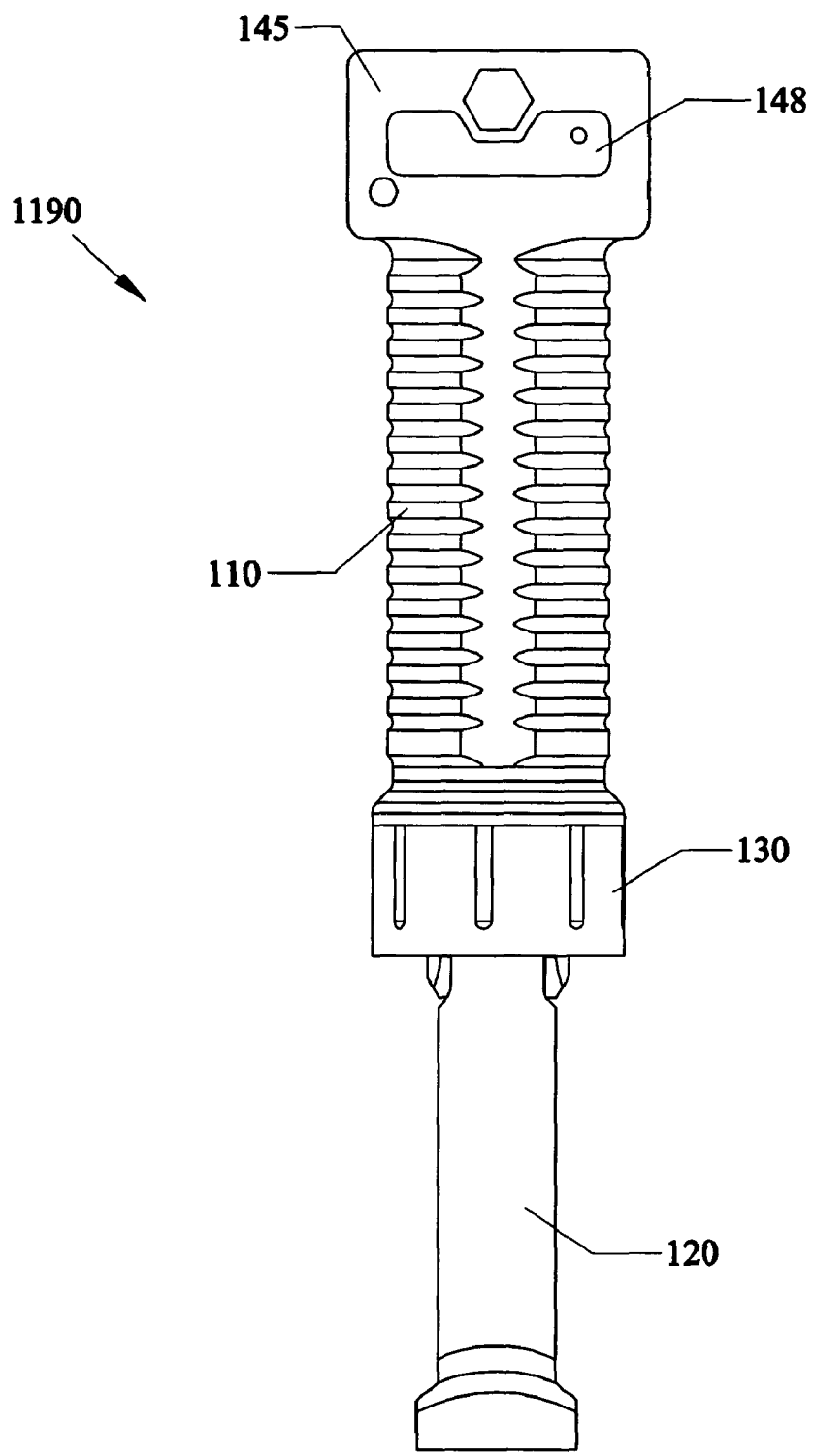
FIG. 21 is a front planar view of FIG. 17.
Figure 22:
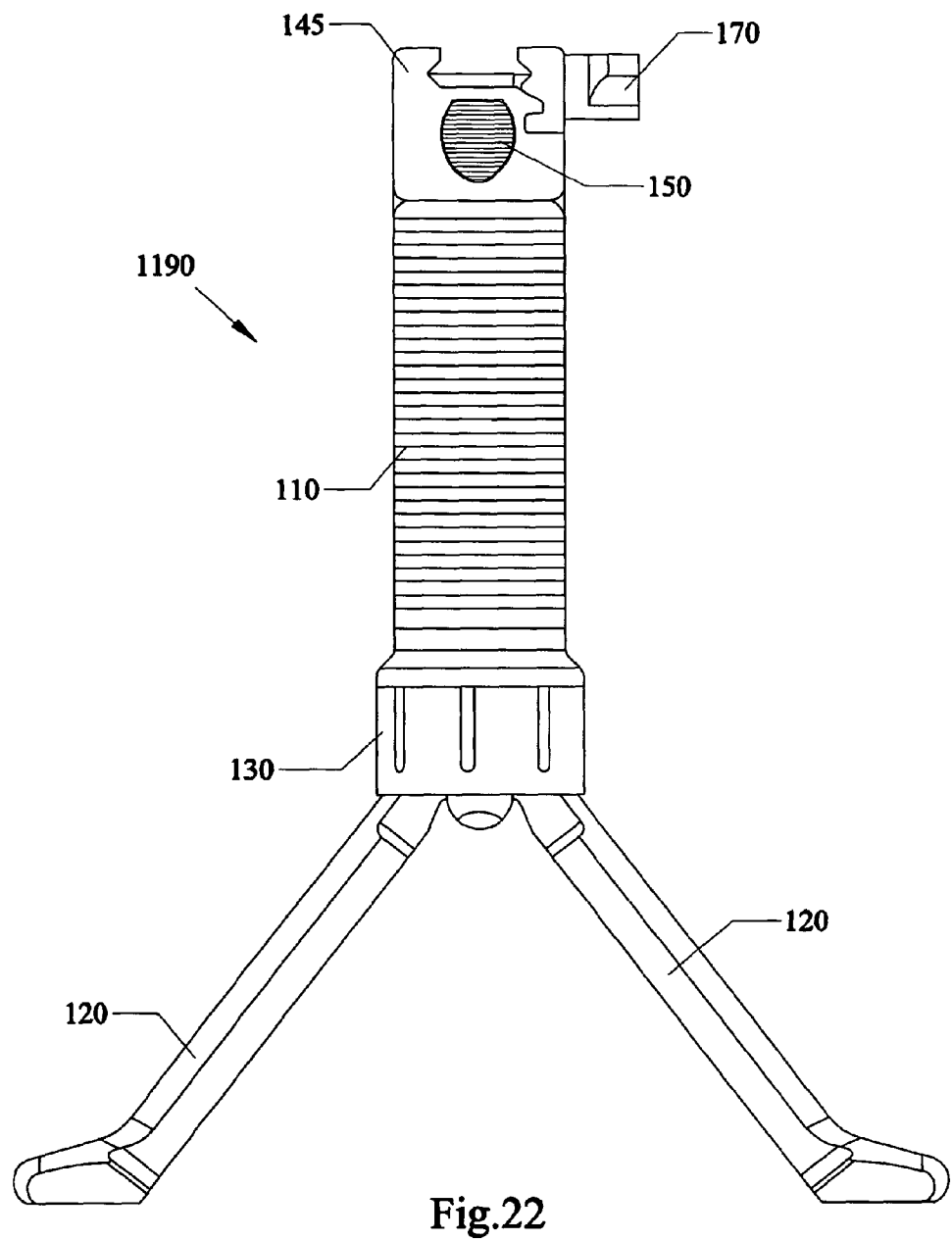
FIG. 22 is a right side view of FIG. 17.
Figure 23:
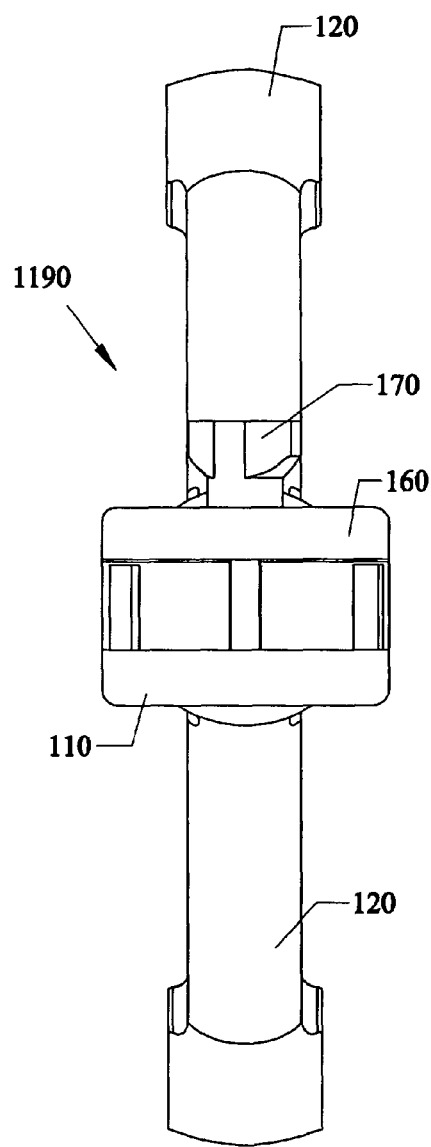
FIG. 23 is a top view of FIG. 17.
Figure 24:
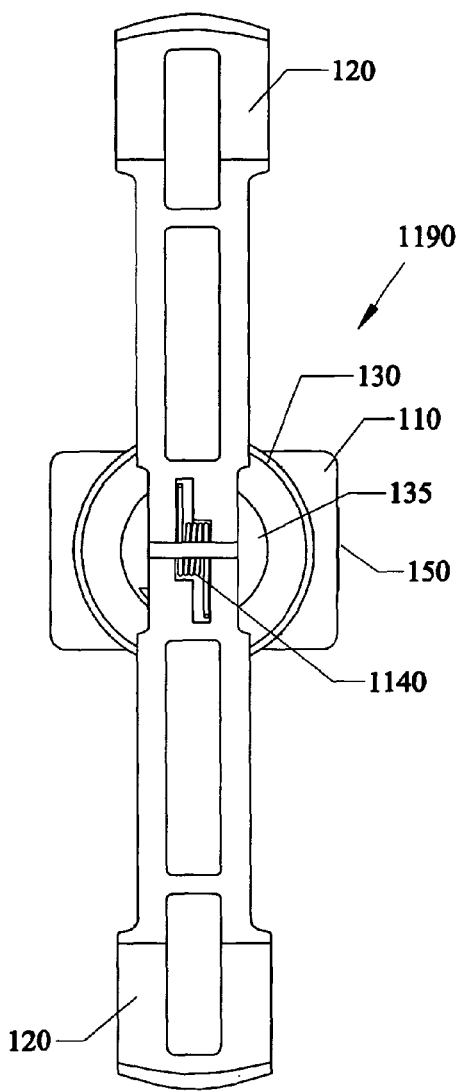
FIG. 24 is a bottom view of FIG. 17.

After the button 150 is depressed, the legs move downward from the handle 110 and expand outward from one another as will be described further on, to a fully deployed position. FIG. 17 is an upper left front perspective view of fore grip 1190 of FIG. 6 with legs 120 down in a deployed expanded position. FIG. 18 is an upper left rear perspective view of FIG. 17. FIG. 19 is a rear planar view of FIG. 17. FIG. 20 is a left side view of FIG. 17. FIG. 21 is a front planar view of FIG. 17. FIG. 22 is a right side view of FIG. 17. FIG. 23 is a top view of FIG. 17. FIG. 24 is a bottom view of FIG. 17.

As previously described, the fore grip 100 initially has a retracted position with the legs 120 side by side inside the handle 110. When the button 150 is depressed, the legs are pushed to extend downward, and finally when the legs leave the housing, the legs then expand outward into a final deployed position. The inner workings of the fore grip will be described in reference to FIGS. 24-32C.

Figure 25:
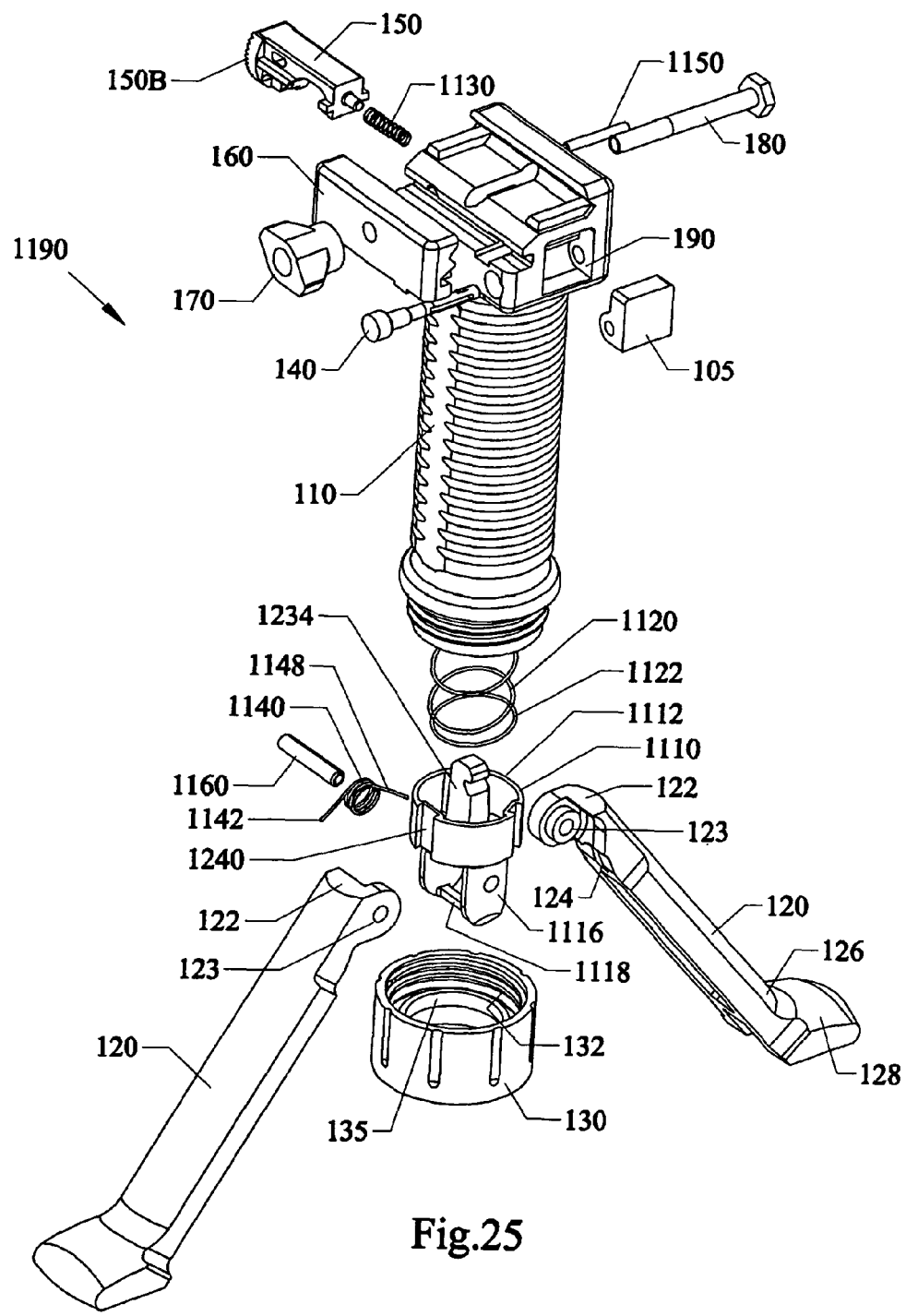
FIG. 25 is a rear perspective exploded view of the fore grip of FIGS. 6-24.
Figure 26:
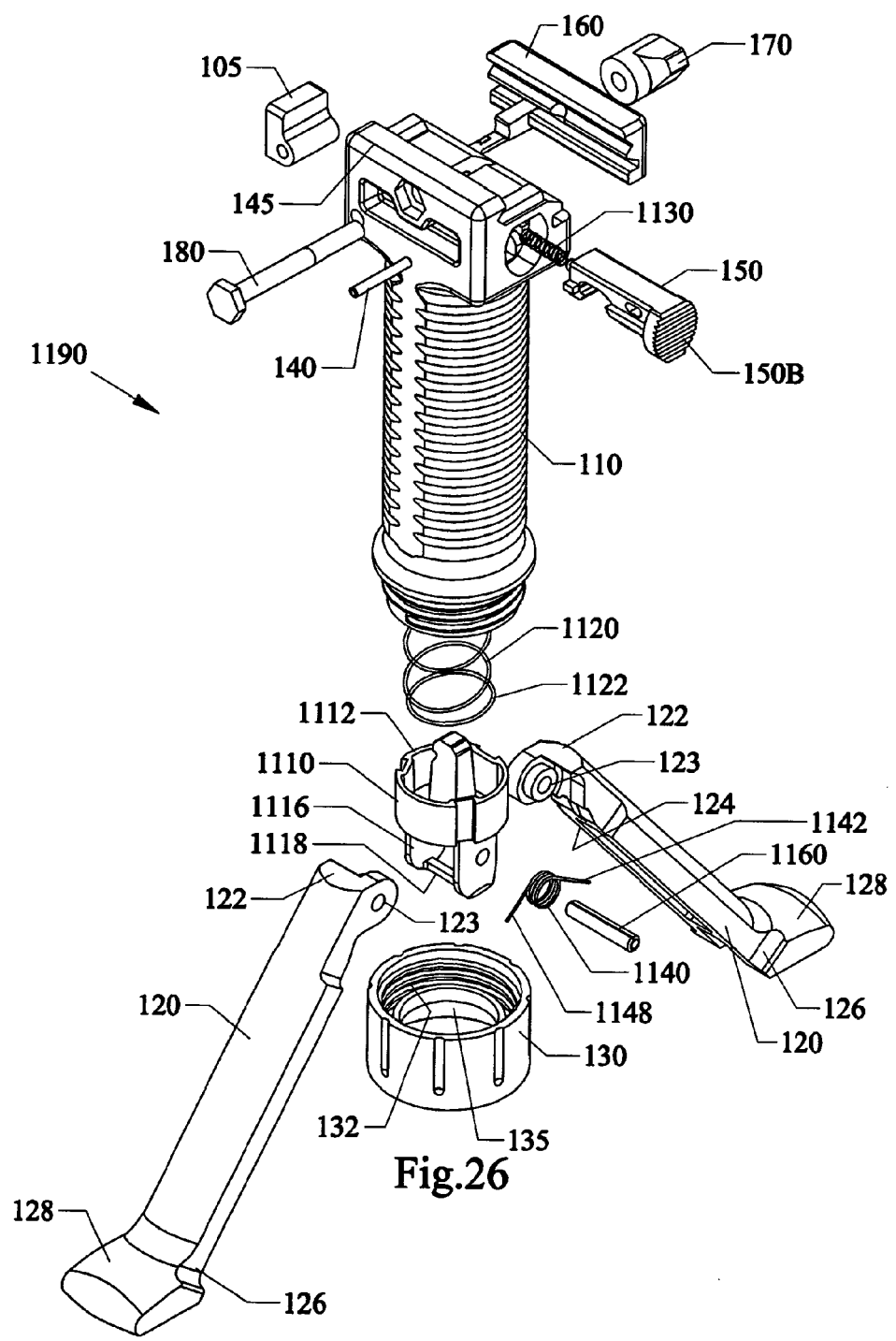
FIG. 26 is a front perspective exploded view of FIG. 25.

FIG. 25 is a rear perspective exploded view of the deployed fore grip 1190 of FIGS. 6-24. FIG. 26 is a front perspective exploded view of FIG. 25.

Figure 27:
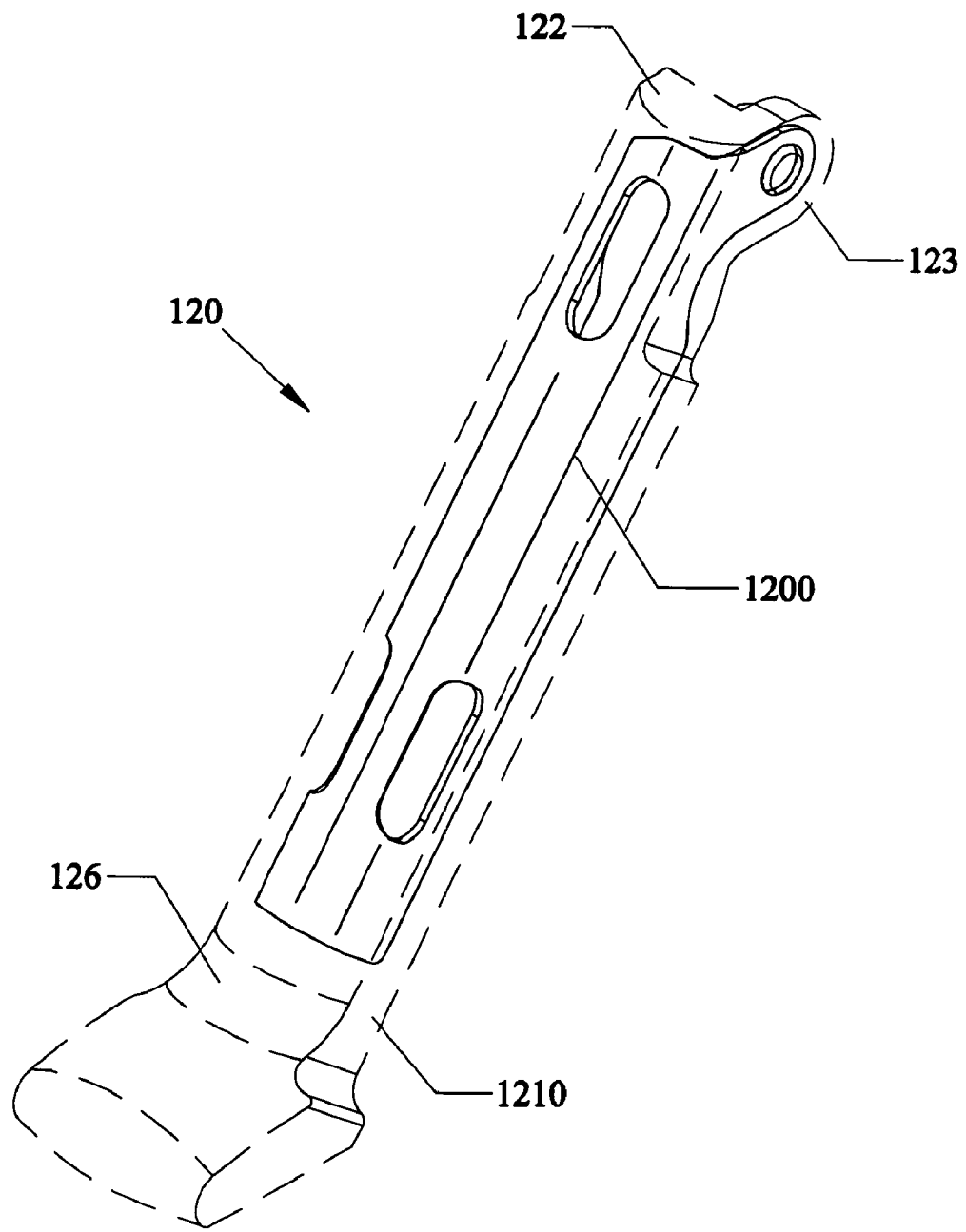
FIG. 27 is an interior detail view of the leg of fore grip with stiffening bar mold insert.

FIG. 27 is an interior detail view of the leg 120 of fore grip 100/1190 with stiffening bar mold 1200 insert. The mold insert 1200 can be formed from metal such as but not limited to stainless steel, aluminum, galvanized metal, and the like, and act as skeletal strengthening and stiffening member inside of each leg 120. Mold insert 1200 can have openings for keeping the insert light while still sturdy and have a shape that can mirror that of the leg 120 from the lower end 126 to upper end 122, 123. Leg 120 can be molded about the mold insert 120 during manufacturing. The material that can be used can include but is not limited to plastic and/or glass filled nylon with and without metal inserts such as aluminum, galvanized metal, stainless steel. As shown in FIG. 27 and elsewhere the legs 120 can include integral feet constructed with a hollow backside and steel reinforcement from the metal insert 1200.

Figure 28:
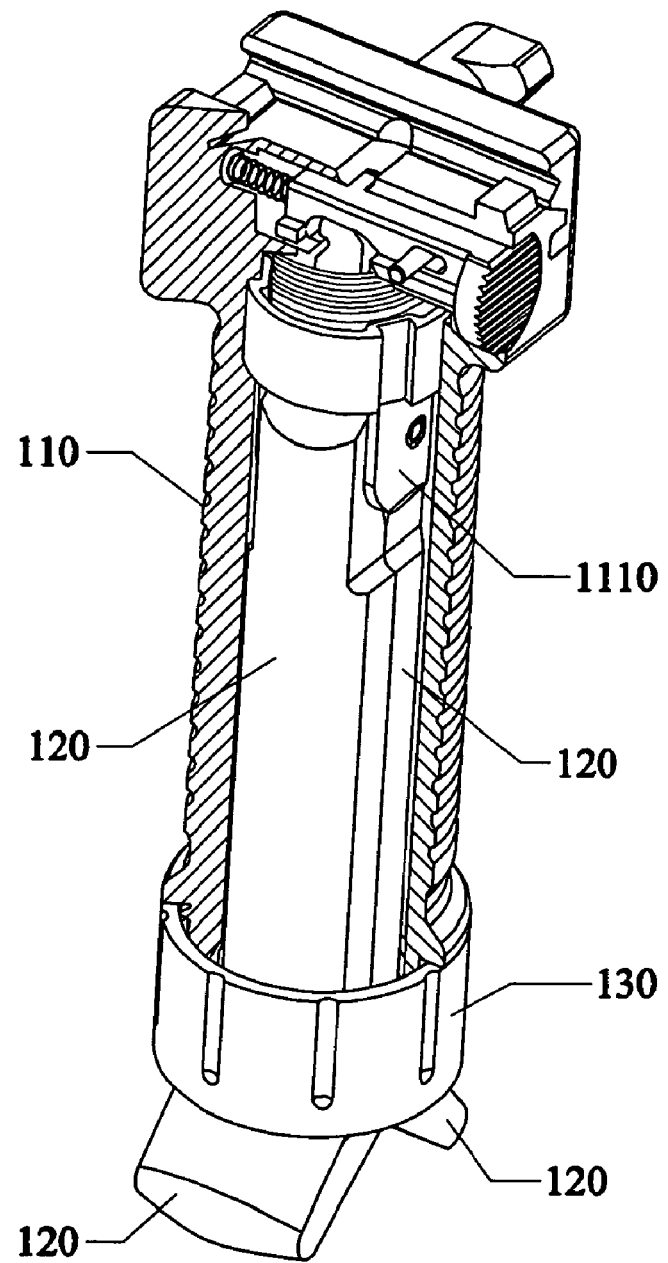
FIG. 28 is a partial cross-section view of the preceding fore grip with legs up.

FIG. 28 is a partial cross-section view of the preceding fore grip 100 with legs 120 up in a retracted position.

Figure 29A:
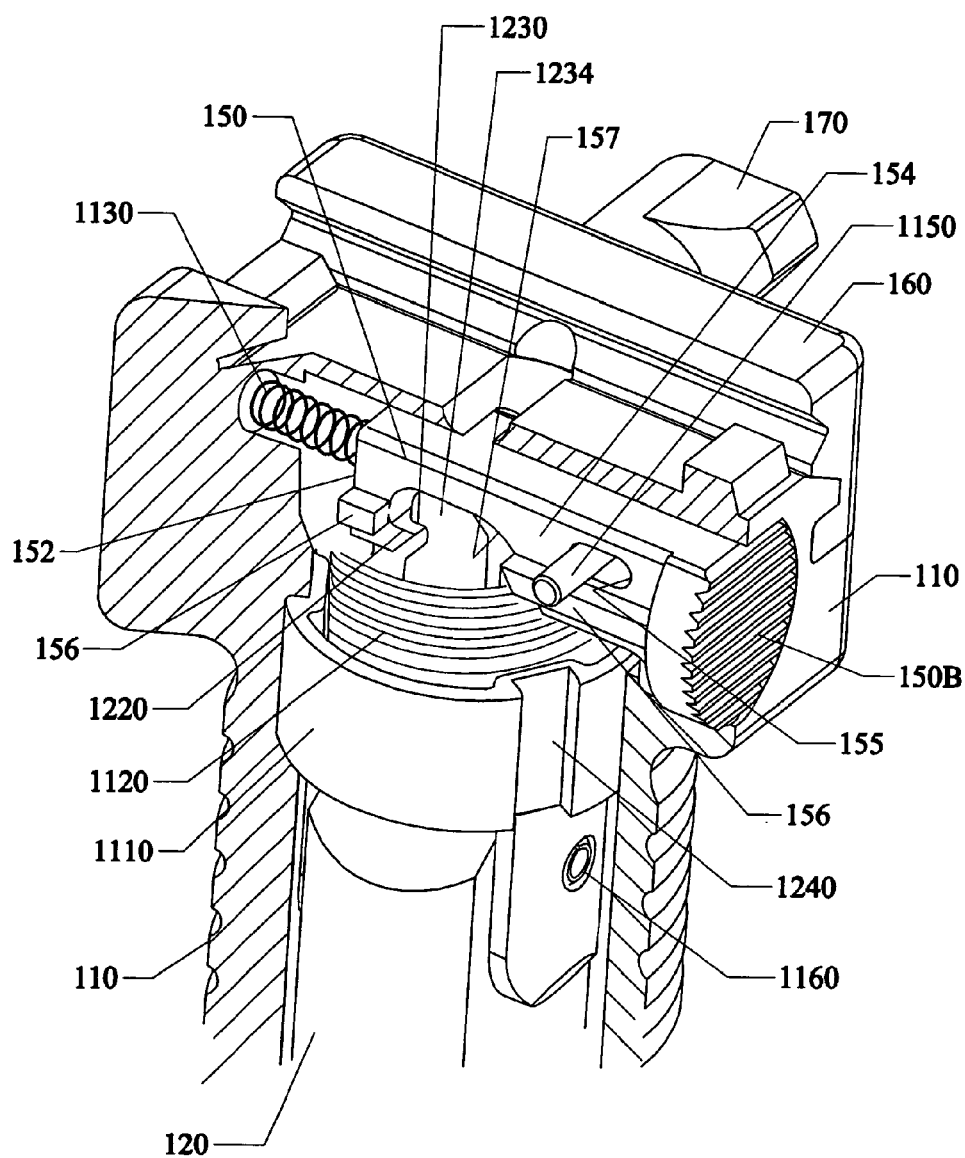
FIG. 29A is a partial cross-section view of an upper portion of the fore grip closed.
Figure 29B:
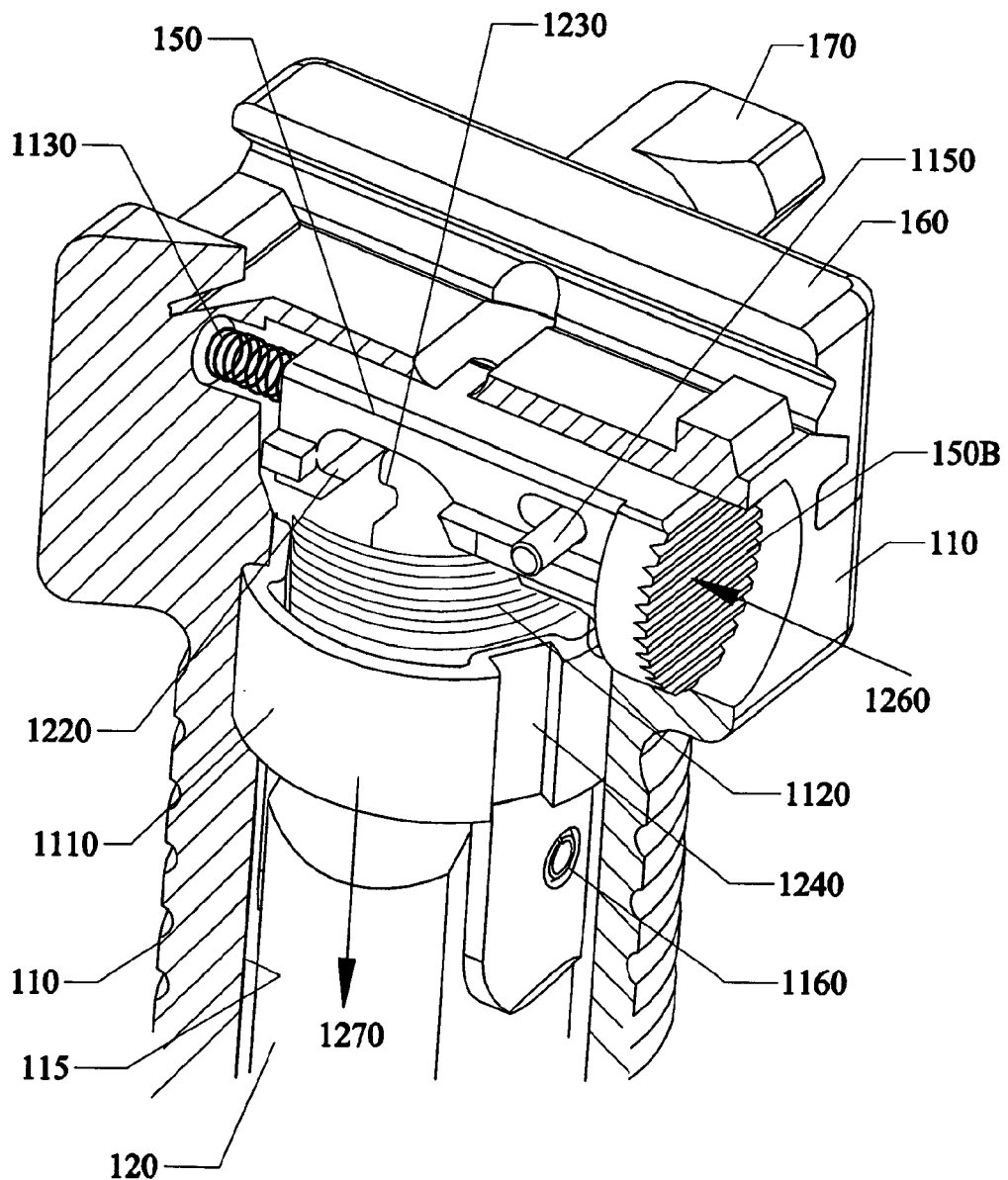
FIG. 29B is another view of the upper portion of FIG. 29A with button being depressed.

FIG. 29A is a partial cross-section view of an upper portion of the fore grip 100 in a closed position. FIG. 29B is another view of the upper portion of FIG. 29A with button 150 being depressed.

Figure 30:
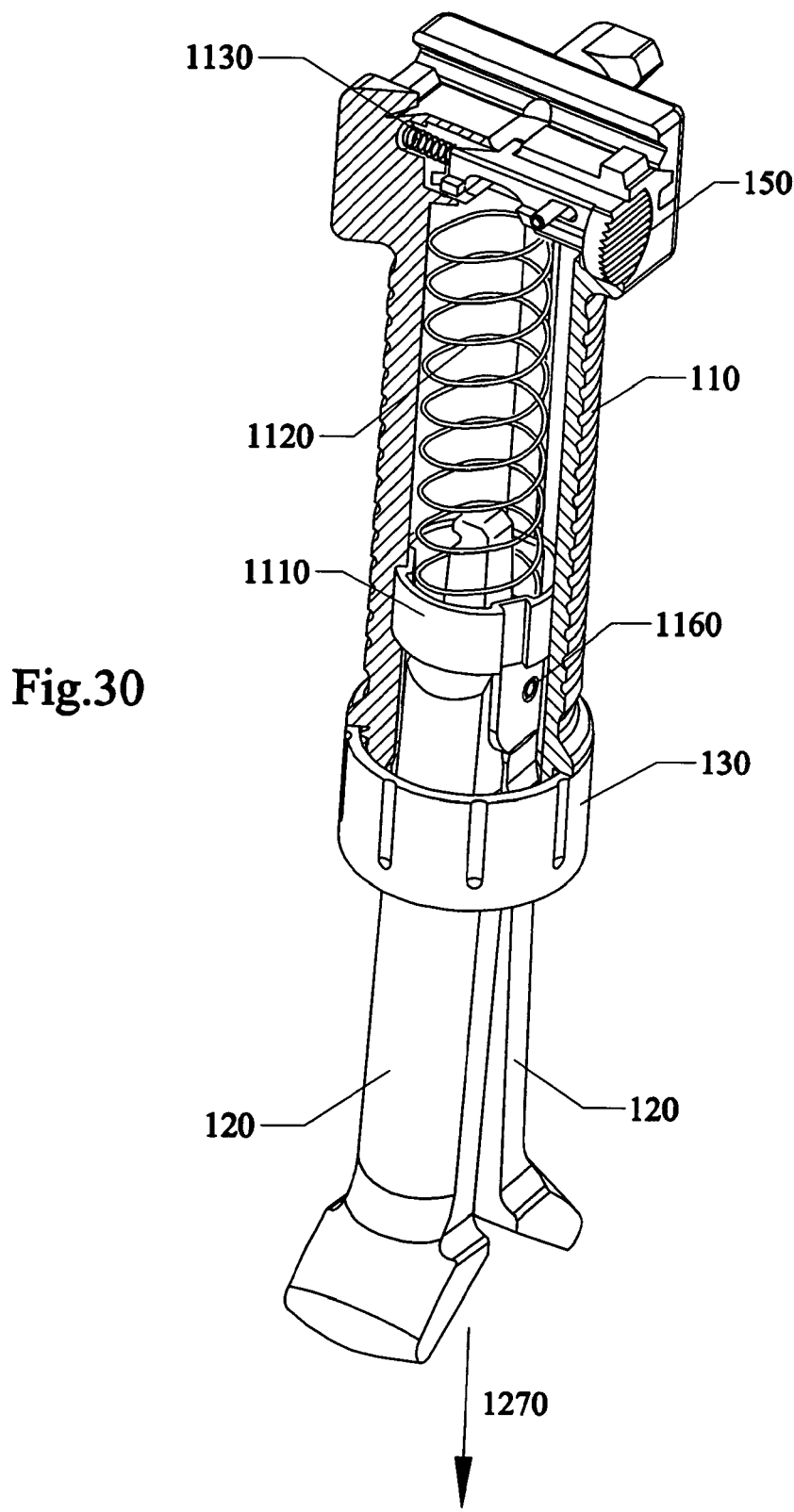
FIG. 30 is a partial cross-sectional view of the leg/yoke assembly and legs of the preceding fore grip being released and traveling downward.
Figure 31:
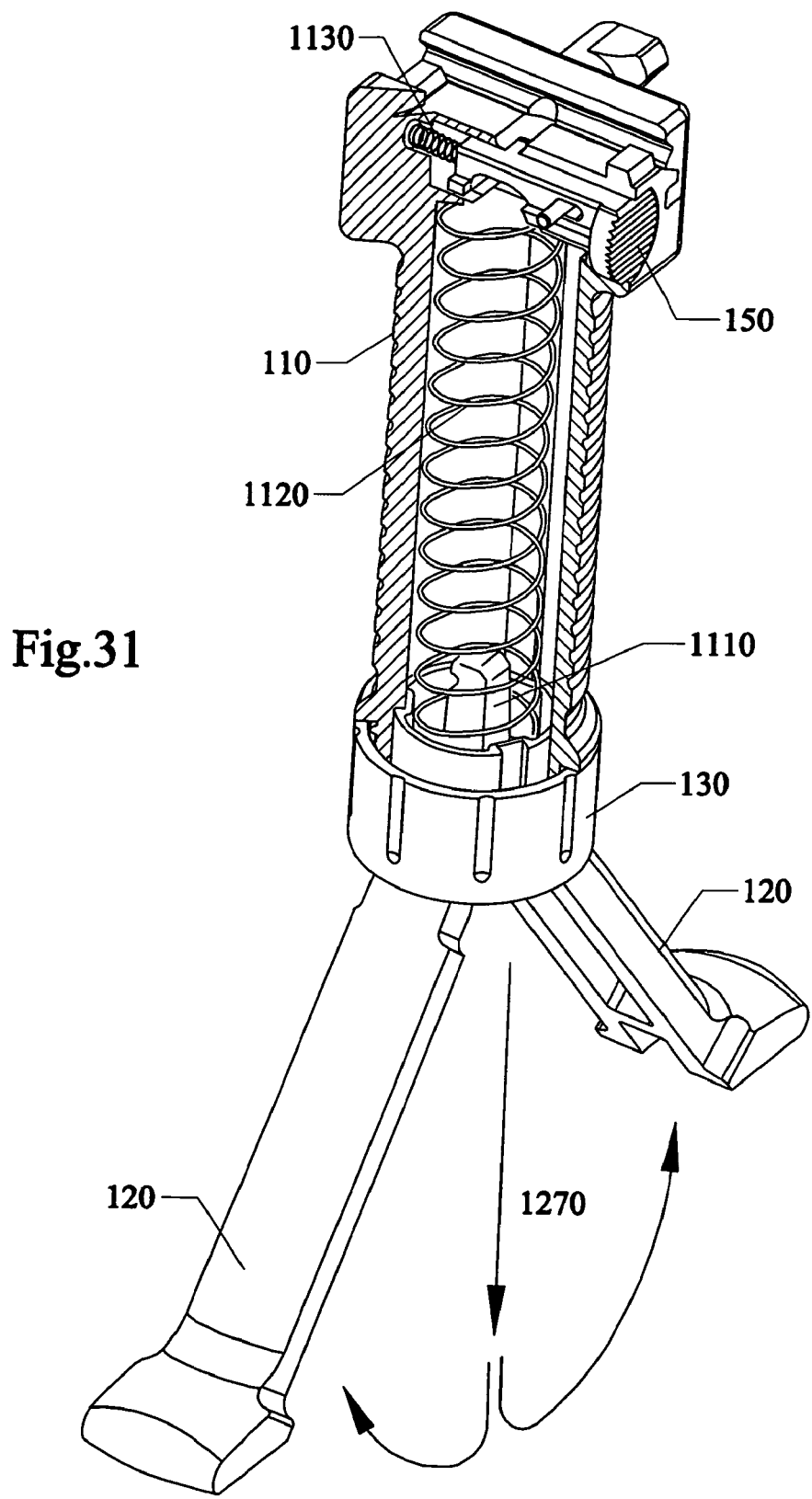
FIG. 31 is another partial cross-sectional view of FIG. 30 with leg/yoke assembly and legs fully deployed.

FIG. 30 is a partial cross-sectional view of the leg/yoke assembly and legs of the preceding fore grip being released and traveling downward. FIG. 31 is another partial cross-sectional view of FIG. 30 with leg/yoke assembly and legs 120 fully deployed.

Figure 32A:
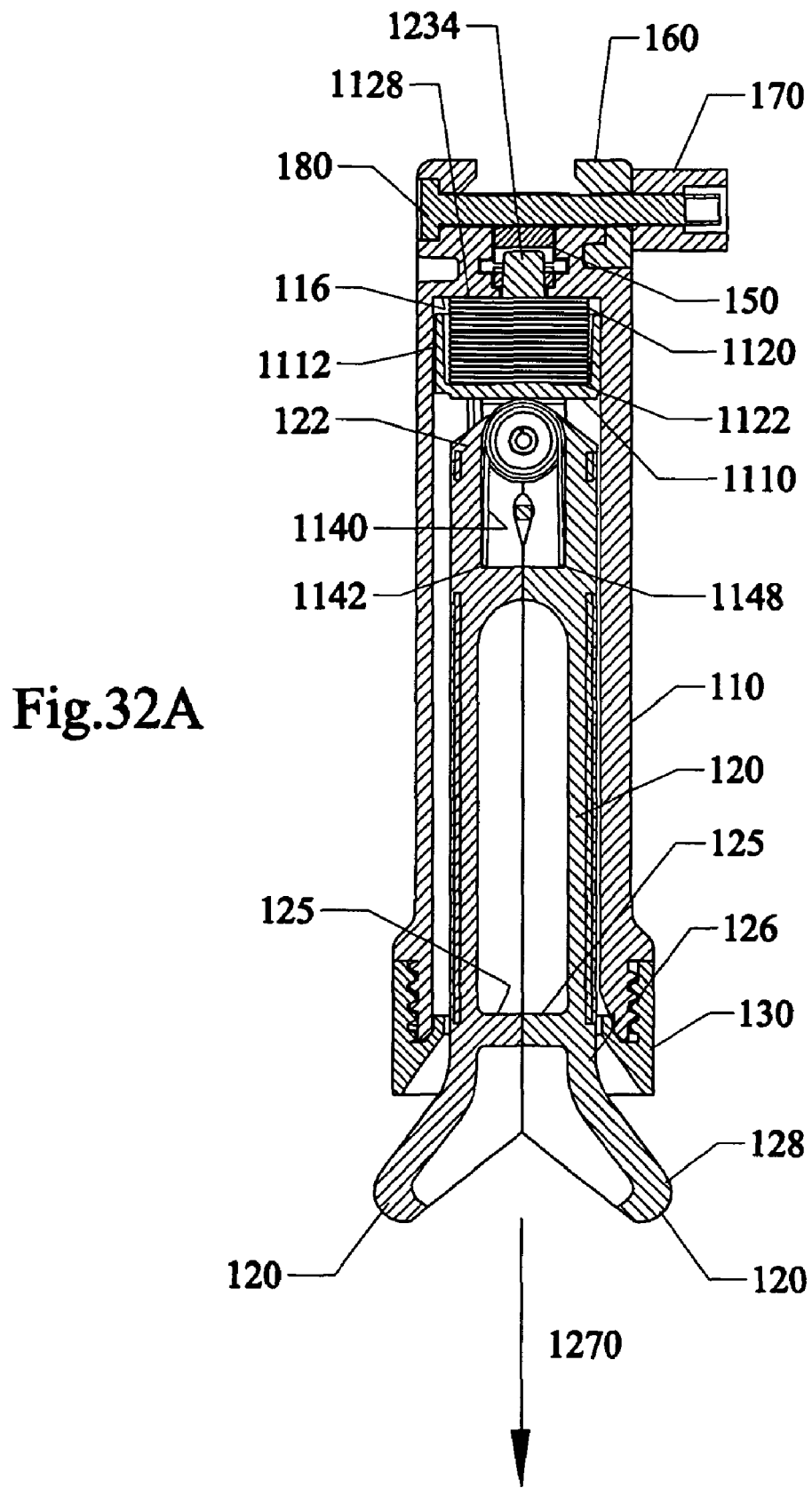
FIG. 32A is a side cross-sectional view of the preceding fore grip in a retracted stage.
Figure 32B:
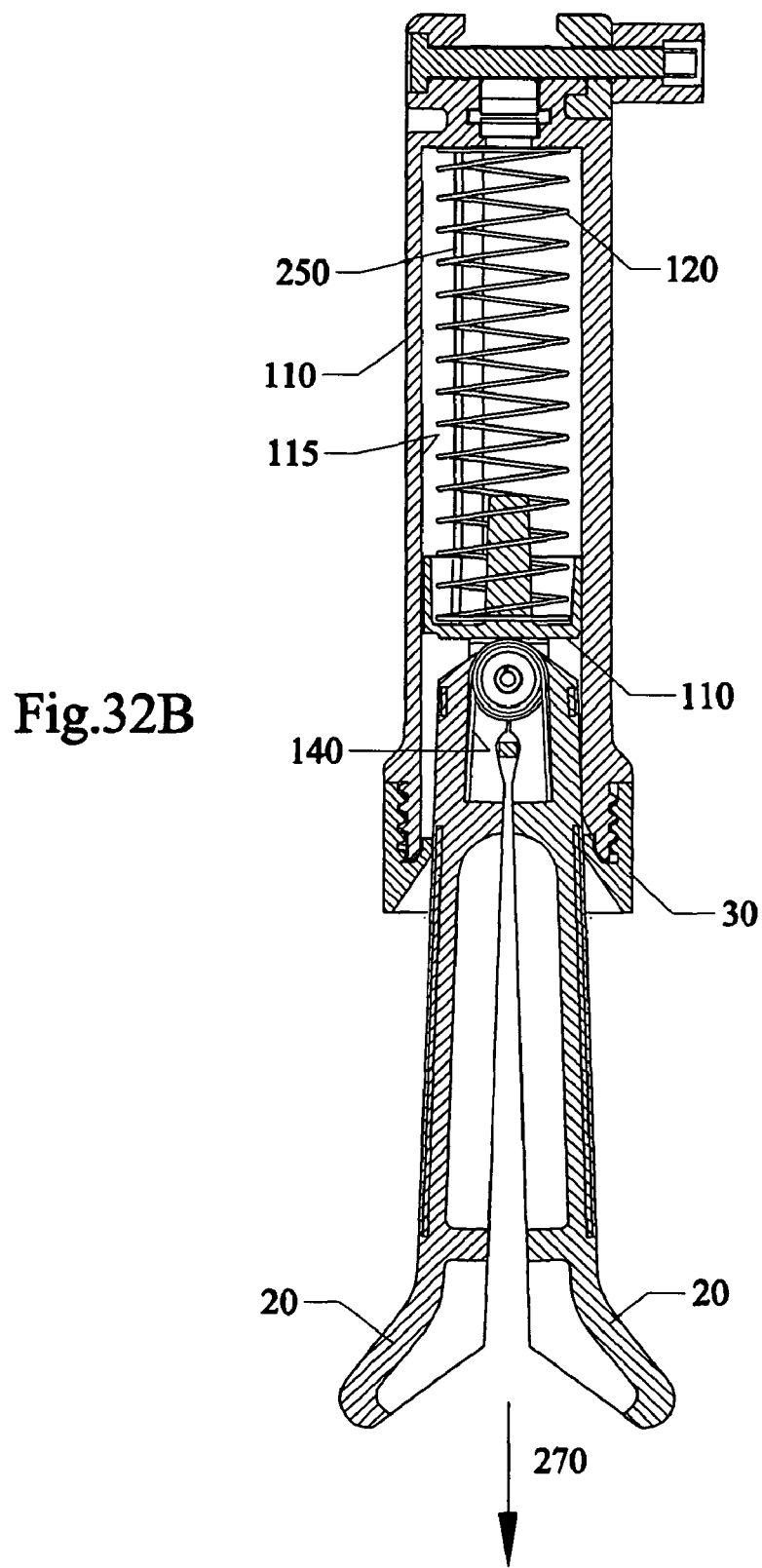
FIG. 32B is another cross-sectional view of the fore grip in an extended stage.
Figure 32C:
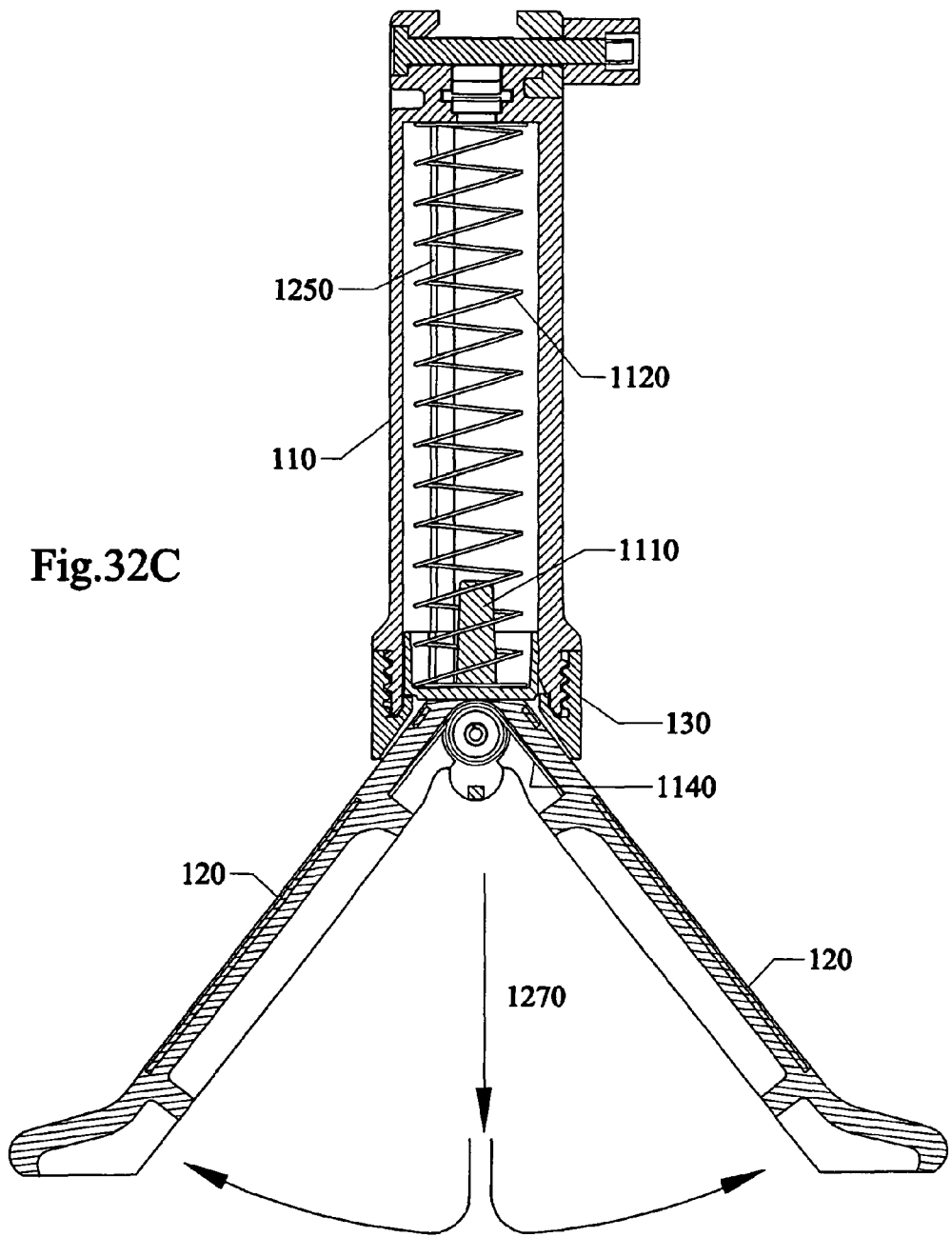
FIG. 32C is another cross-sectional view of the fore grip in an deployed stage.

FIG. 32A is a side cross-sectional view of the preceding fore grip 100 in a retracted stage. FIG. 32B is another cross-sectional view of the fore grip 100 in an extended stage. FIG. 32C is another cross-sectional view of the fore grip 100 in a deployed stage.

Retracted/Closed Position-Inside of Fore Grip

The operation of the fore grip 100 will now be described in the closed/retracted position. Referring to FIGS. 6, 11, 25, 26, 28, 29A, 32A, and 37, the fore grip 100 is shown at a rest position, with the depressible button 150 positioned inside an side cavity of the head piece 145 and can slide in limited distance by the elongated oval shaped groove 155 in the shaft 154 of the button 150 moving relative to a fixed actuator slide pin 1150. The sides of the shaft 154 can have raised rail edges 56 which slide in mateable grooved inner walls inside of the head piece 145.

In the rest position, the inner end 152 of the button 150 is biased by an actuation compressor spring 1130 against so that an outer face end 150B sits flush against the side face of the head piece 145. The underside of button shaft 154 can have a cut-out cavity 157 with an actuator pawl 1220 that functions as a catch for catching against a side protruding portion 1230 of a leg yoke pawl 1234.

The fore grip 100 is shown at a rest position, with the depressible button 150 positioned inside a side cavity of the head piece 145 and can slide in limited distance by the elongated oval shaped groove 155 in the shaft 154 of the button 150 moving relative to a fixed actuator slide pin 1150. The sides of the shaft 154 can have raised rail edges 56 which slide in mateable grooved inner walls inside of the head piece 145.

The leg yoke pawl is fixably attached to the inside base of a cylindrical yoke member 1110. The bottom end 1122 of a yoke compression spring sits against a floor surface formed between leg yoke pawl 1234 and raised sides 1112 of cylindrical yoke member 1110. The upper end 1128 of the yoke compression spring seats against a ceiling surface 116 inside the handle 110.

Yoke guide slots 1140 along the sides of the yoke pawl 1234 allow the yoke pawl with attached legs 120 to slide straight up and straight down without twisting along vertical raised ridges inside of the handle 110.

Extending beneath the cylindrical leg yoke are two parallel leg tabs 1117, with through-holes 1117 for allowing the leg pivot pin 1160 to pass therethrough. Across the outer ends of the tabs 1117 can be a stiffening brace 1118 for keeping the tabs 1117 in fixed separation from one another. A leg torsion spring 1140 can be held in place by the leg pivot pin 1160 so that the outer ends 1142, 1148 of spring 1140 respectively push against upper inner surface portions 124 of legs 120.

The upper end 122 of the legs 120 each include tabs with inwardly protruding hollowed out rings 123. The rings 123 function to allow the leg pivot pin 1160 to pass therethrough and act as seats to support the tension spring 1140. In the closed/retracted position, the inside cavity walls 115 of handle 110 keep the legs 120 sandwiched together against the biasing of torsion spring 1140 so that inside ribs 125 of the legs abut against one another, and the feet 128 are angle away from one another at the bottom ends 126 of each leg 120.

Depressing Button to Extending Position-Inside of Fore Grip

The operation of the fore grip 100 will now be described after the button 150 is depressed. Referring to FIGS. 6, 11, 25, 26, 28, 29B, 30, 32B, 37 and 38, a user gripping about handle 110 can use their finger such as their thumb to depress button 150 by pressing against button face 150B. Depressing button 150B causes button shaft 154 to slide inside cavity of head piece 145 pressing against spring 1130, and pushing actuator pawl 1220 away from side protruding portion 1230 of Leg yoke pawl 1234. This release of the catch causes the spring 1120 to expand pushing leg yoke pawl 1234 and connected components to yoke 1110 and legs 120 downward inside handle cavity 115 in the direction of 1270 to exit from bottom open end 118 of the handle 110 of fore grip 100.

Full Deployment-Inside of Fore Grip

The operation of the fore grip 100 going to a fully deployed position will now be described. Referring to FIGS. 16A-26, 31, 32C, and 39, as the legs 120 pass out the bottom open end 118 of the handle 110 of the fore grip, the leg torsion spring causes the bottom ends 126 of the legs 120 to expand and pivot outward relative to pivot pin 1160. When the upper ends 122 of the legs 120 passes the open bottom 118 of the handle 110, the legs 120 become fully deployed to position 1190.

Referring to FIGS. 11, 13-15, 24-36 and 30-32C, the retainer cap 130 has sides with inner threads that allows the cap to tighten to thread along the bottom outer walls of handle 110. Through the top of cap 130 is a hole 135 that has a diameter larger than the widths of sandwiched legs 120, but smaller than the diameter of outer walls 112 of leg yoke 1110. The retainer cap 130 can function to secure the bipod legs 120 inside the handle 110 and permits and limits the yoke 1110 and other components from falling out of the handle 110 during deployment. The yoke 1110 and legs 120 can function as a sliding piston whose sliding action is limited by the cap cover 130.

To retract the legs 120, the user can merely squeeze the lower ends 126 of legs 120 together until they are sandwiched together as shown in FIG. 30. The user can then push up on feet 128 until the legs 120 move back into the chamber 115 in the opposite direction to arrow 1270. The legs 120 are pushed up until the upper inclined edge top of side protruding portion 1230 of leg yoke pawl 1234 abuts against the like inclined bottom edge of actuator pawl 1220 pushing button 150 slightly against spring 1130. Upward pressure can slightly depress spring 1130 until the side protruding portion 1230 of leg yoke pawl 1234 snaps over to catch on the top of actuator pawl 1220 until the position shown in FIG. 29A is reached.

Accessory Adapters

FIG. 33 is a rear perspective enlarged upper view of the preceding fore grip 100 showing accessory mounting bay plug 105. FIG. 34 is another view of the upper portion of the fore grip 100 of FIG. 33 showing the mounting bay plug 105 and friction pin 140 removed. The friction pin 140 can have an enlarged head 142, and an elongated shaft 144 with raised/barbed edges 145. The accessory mounting bay plug 105 can be sized to fit into accessory mounting bay 190 formed in side face of head piece 145. Through-holes 195 can be on side walls to bay 190. The plug 105 can be held in place inside of bay 190 by sliding the raised/barbed edges 145 on shaft 144 of pin 140 into through-holes 195 and holes 109 in plug tabs 107. Pulling the pin 140 by head 142 outward away from head piece 145 can allow the plug 105 to be released from bay 190.

FIG. 35 is another view of FIG. 33 showing an accessory switch 1280 and friction pin 140 ready to be installed. FIG. 36 is another view of FIG. 35 showing the accessory switch 1280 and friction pin 140 installed. The back of accessory switch 1280 can have a raised plug 1287 sized to fit inside of bay 190 and held in place by pin 140 in a manner similar to that described in FIGS. 33-34. The accessory switch 1280 can have a step shaped configuration with a lower portion 1282 having a depressible power switch 1283, reachable from a finger or thumb of a user gripping about handle 110 that can turn power on and off to plug 1285 that can be hooked to accessory equipment. The accessory equipment can include but is not limited to a flashlight, laser light target finder that can also be used with the weapon the fore grip is attached to. The novel accessory unit plug 1280 can be modified to include a depressible switch 1283 and accessory (i.e. Light, laser, and the like), such as those manufactured by Insight Technology Inc. of Londonberry, N.H., or Crimson Trace Corp. of Beaverton, Oreg.

Gravity/Hand-Pull/Flip Leg Extender

Figure 37:
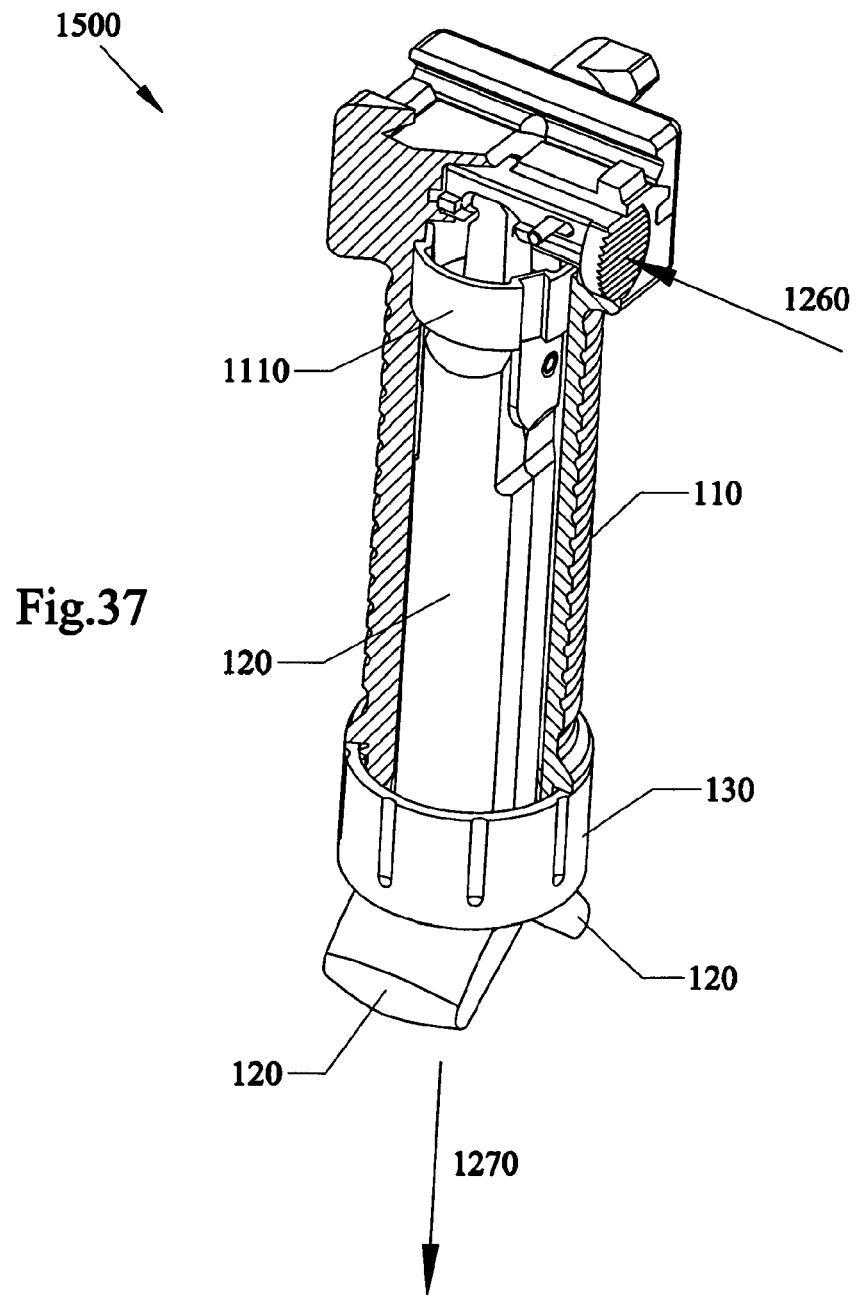
FIG. 37 is an upper perspective partial cross-sectional view of another embodiment of the fore grip with legs up and no yoke spring.
Figure 38:
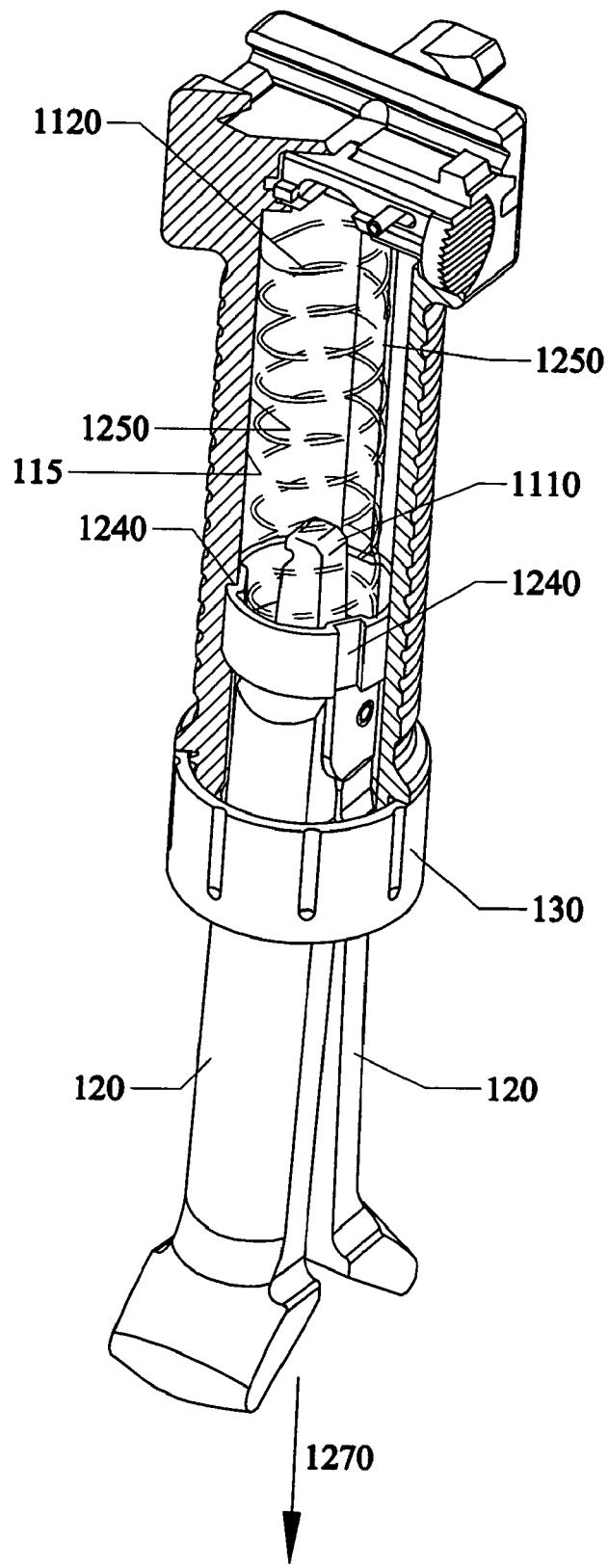
FIG. 38 is another view of FIG. 37 of leg/yoke assembly/legs released and traveling down using gravity only (no spring).
Figure 39:
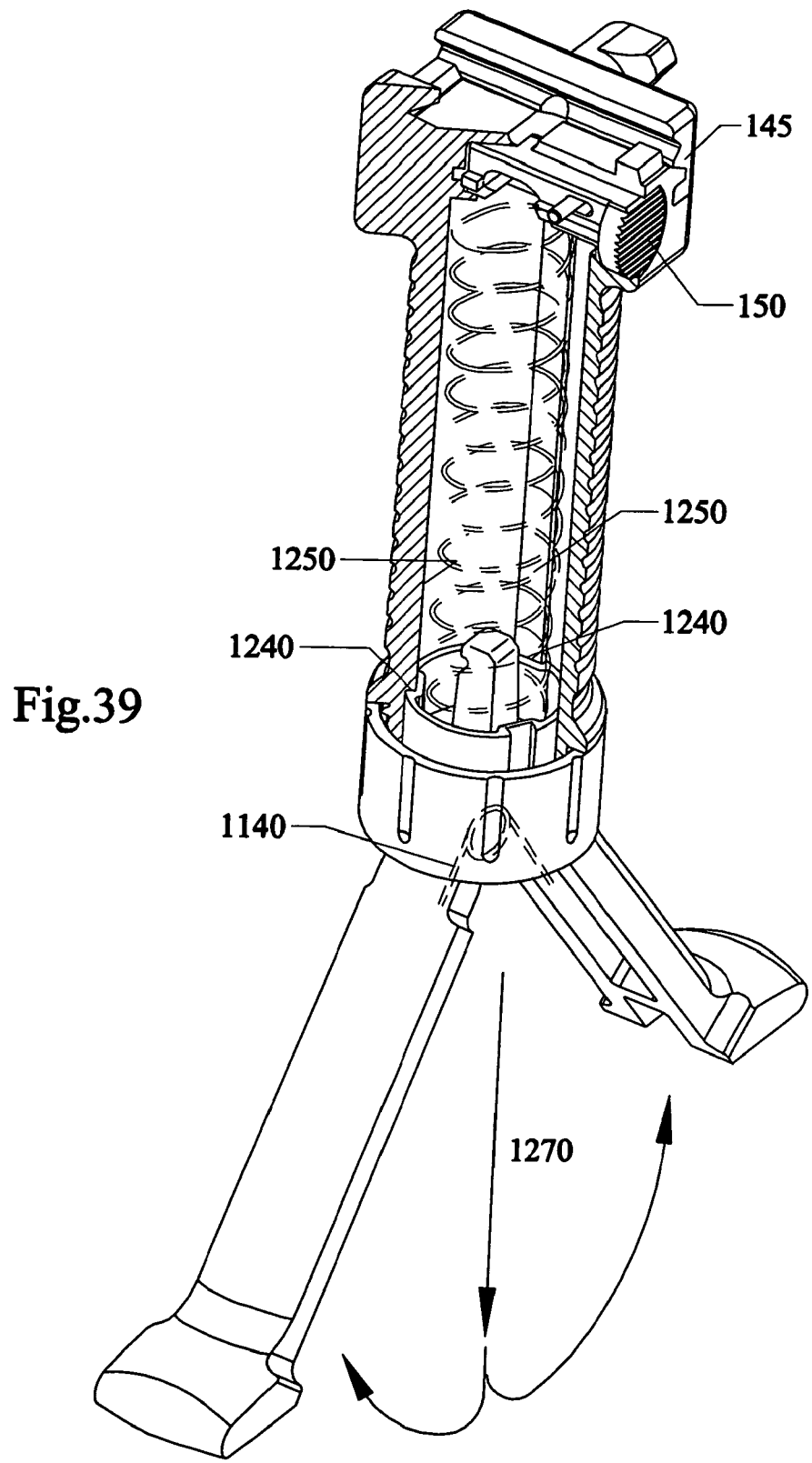
FIG. 39 is another view of FIG. 37 showing leg/yoke assembly and legs fully deployed.

FIG. 37 is an upper perspective partial cross-sectional view of another embodiment of the fore grip 1500 with legs 120 up and no yoke spring (1120 as shown in the previous figures). FIG. 38 is another view 150 of FIG. 37 of leg/yoke assembly 1240/legs 120 released and traveling down using gravity only (no spring). FIG. 39 is another view of FIG. 37 showing leg/yoke assembly 1240 and legs 120 fully deployed.

Referring to FIGS. 37-39, this version can use only one spring (the leg torsion spring 1140). Similar to the previous embodiment, the legs 120 can initially be retracted inside handle 110. Depressing button 150 releases a catch that holds yoke assembly 1240 and legs 120. The inside cavity 115 of handle 110 can be sized large and loose enough that yoke guide slots 1240 can slide along inner protruding rails 1250 so that gravity will allow for legs 120 to drop out from underneath handle 110, and then easily expand outward by the tension spring.

Alternatively, the user presses button 150, and easily pulls feet 128 of legs 120 downward in direction of arrow 1270, until the tension spring 1140 causes the legs 120 to expand outward.

Still furthermore, this version can function similar to a switch blade knife, where the user grips handle 110 and depresses button 150 and then jerks and/or flips (by inertial actuation) the handle downward allowing for an inertial actuation of the legs 120 falling out of the handle 110, and then expanding outward by the single spring 1140.

The legs 120 can be retracted back into handle 110 in a manner similar to that previously described.

Figure 40:
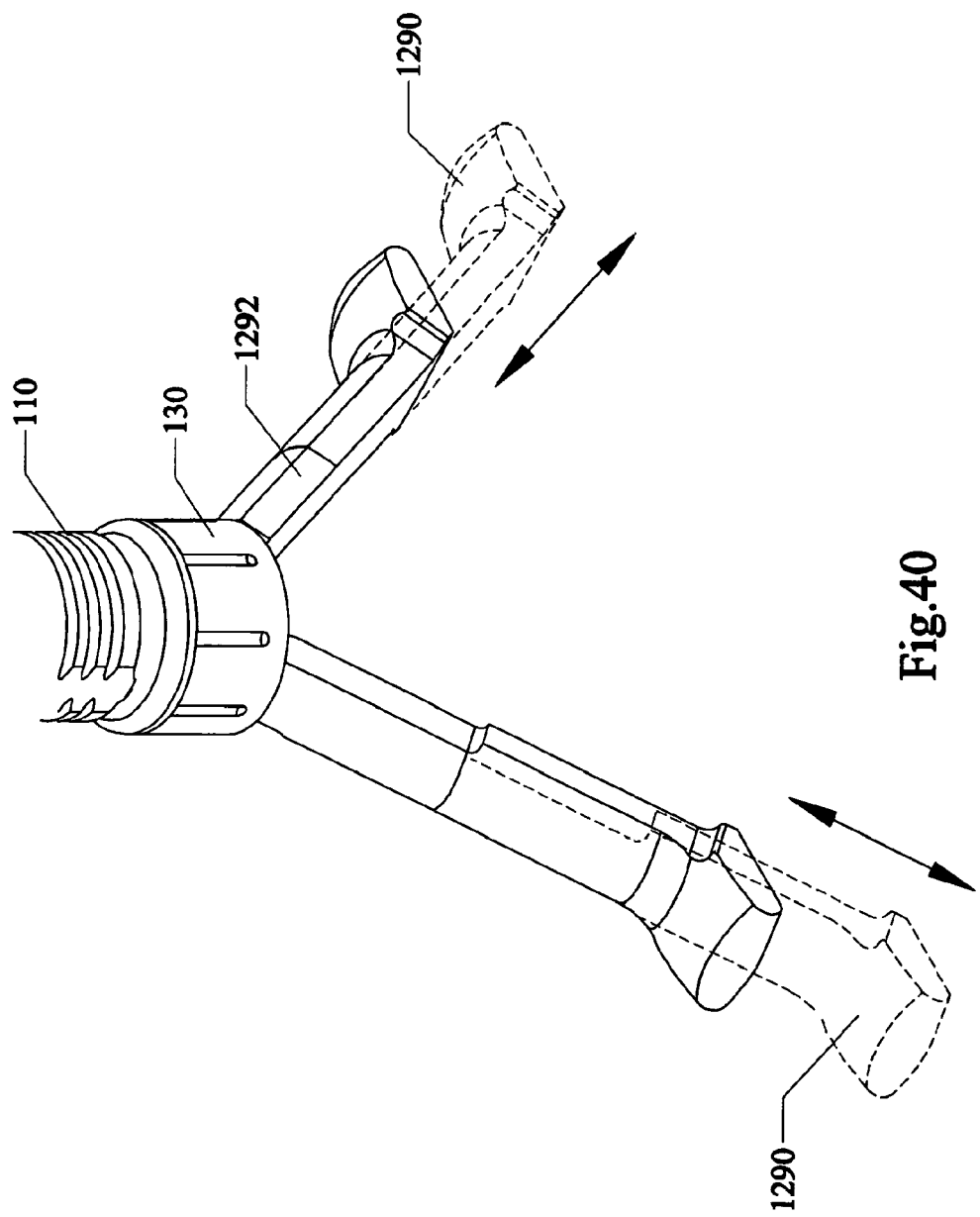
FIG. 40 is a bottom view of another embodiment of the fore grip with extendable legs.

FIG. 40 is a bottom view of another embodiment of the fore grip with extendable legs 1290. Each of the legs can have telescoping portions with feet similar to the previous embodiments. The upper end can telescope in and out of a fixed stub portion having a hollow middle in a manner similar to that on a camera tripod stand. The user can slide each leg to the same heights or different heights as terrain and weapon surface placement conditions demand.

Figure 41:
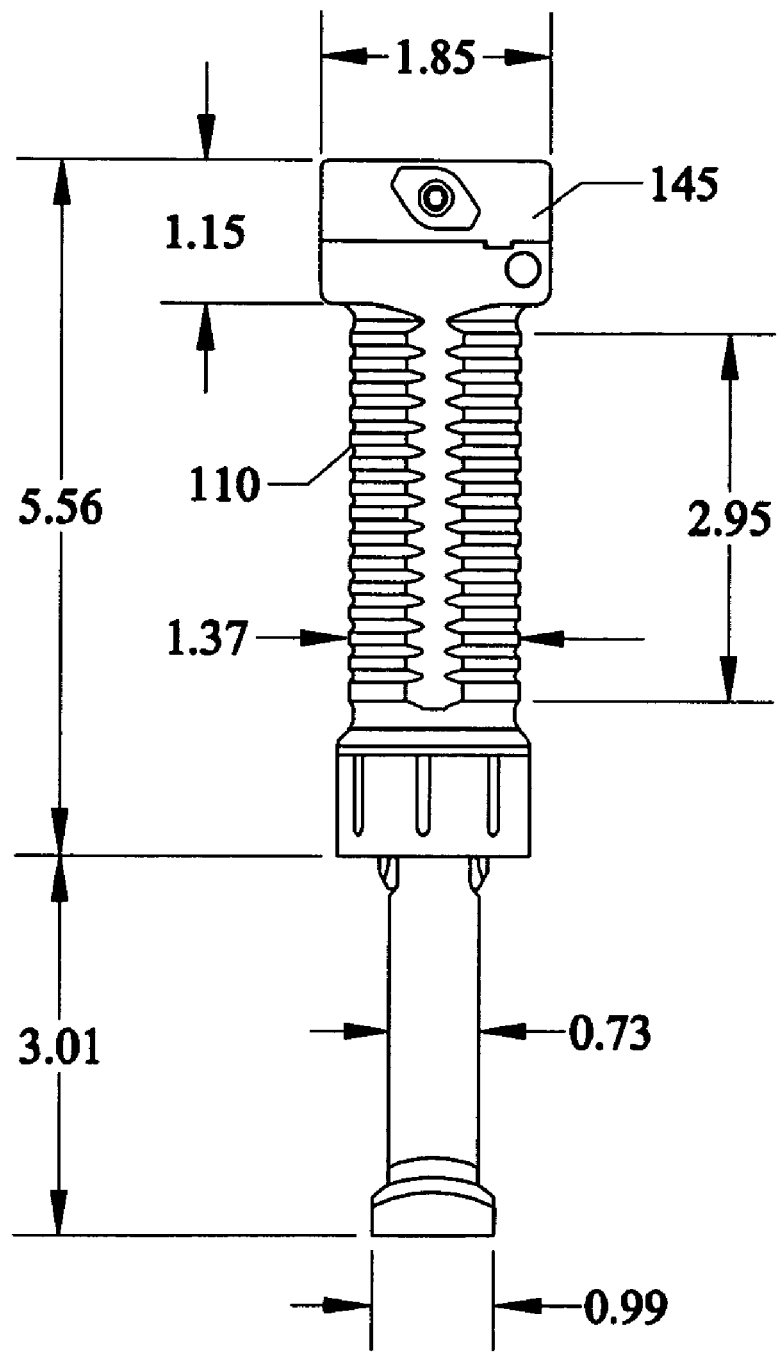
FIG. 41 is a rear view of the preceding deployed fore grip with dimensions.
Figure 42:
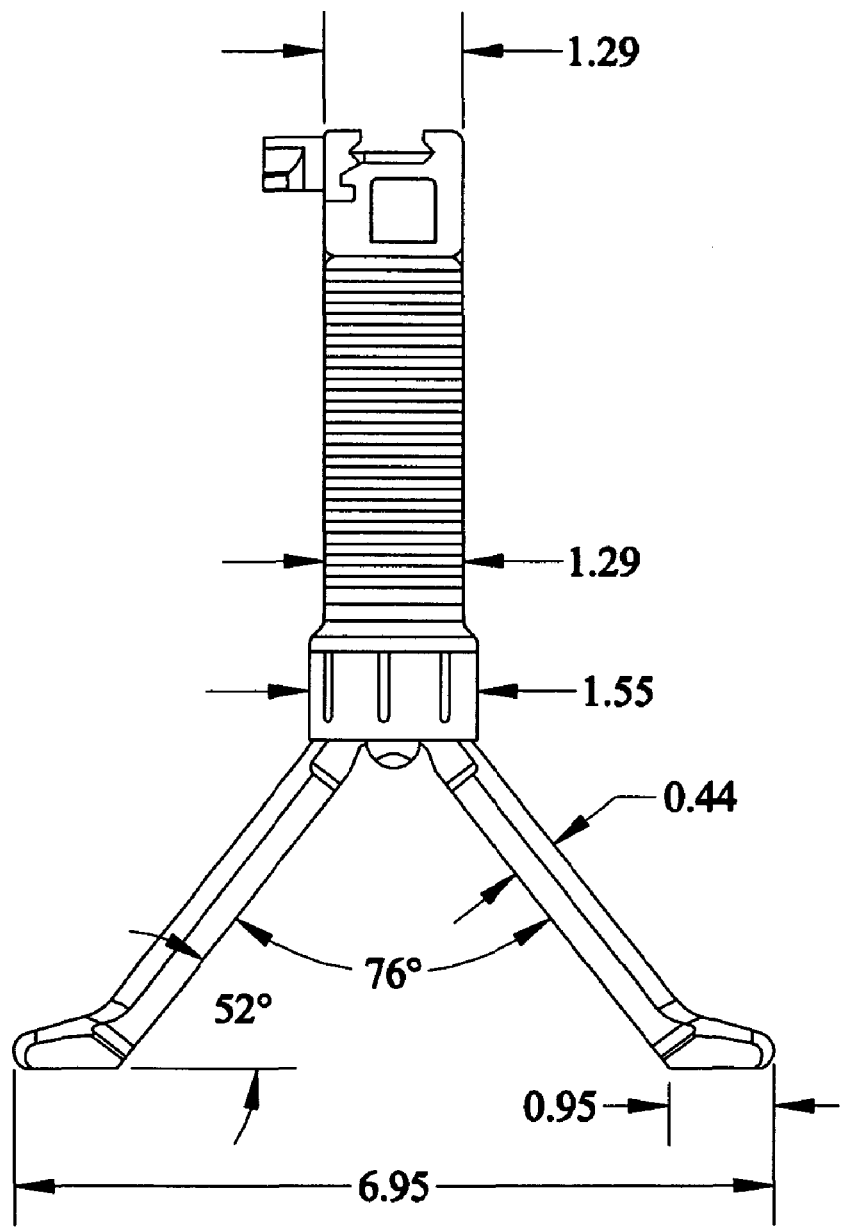
FIG. 42 is a left side view of the deployed fore grip of FIG. 41 with dimensions.
Figure 43:
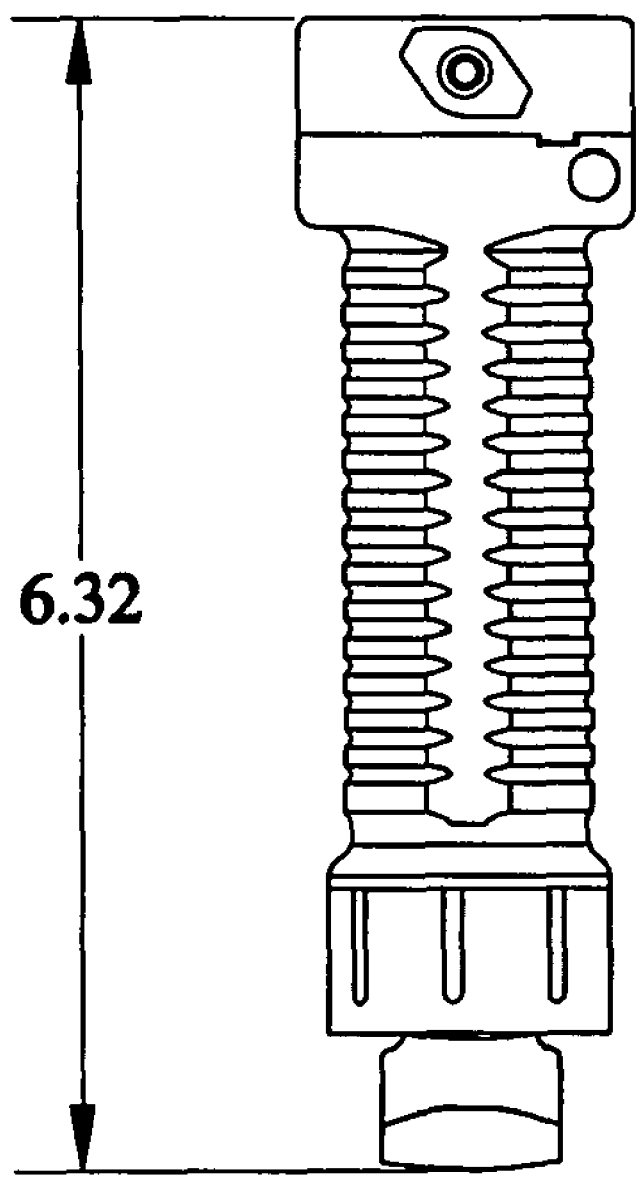
FIG. 43 is a rear view of the preceding retracted fore grip with dimensions.

FIG. 41 is a rear view of the preceding deployed fore grip 100 with dimensions. FIG. 42 is a left side view of the deployed fore grip 100 of FIG. 41 with dimensions. FIG. 43 is a rear view of the preceding retracted fore grip 100 with dimensions. A preferred embodiment can have the head piece 145 having a length of approximately 1.85 inches a width of approximately 1.29 inches and a height of approximately 1.15 inches. In a fully leg retracted/closed position, the fore grip can have a height of approximately 6.32 inches. The handle portion 110 can have a length of approximately 2.95 inches and a width of approximately 1.37 inches. The legs can have a width of approximately 0.73 inches along with the feet having a width of approximately 0.99 inches. In a fully deployed/expanded position, the fore grip can have an overall height of approximately 8.57 inches, with the legs 120 having a spread eagle angle therebetween of approximately 76 degrees, and the inside angle of the feet 128 to the rest of the legs being approximately 52 degrees. The feet can be spread apart from toe to toe at approximately 6.95 inches.

Although, the preferred embodiment lists specific dimensions, the invention can be practiced with different sized and shaped components.

The fore grip can be made from various components such as but not limited to polymeric materials, such as but not limited to plastic and/or glass filled nylon with and without metal inserts such as aluminum, galvanized metal, stainless steel, and the like Additionally, the fore grip can include void spaces where possible to decrease weight.

Although a depressible button is shown above, the invention can use other types of activation such as but not limited to toggle switches, pressure actuated switches, temperature actuated switches and the like, to release the inside legs to slide down and expand outward from beneath the housing.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A handgrip apparatus for a firearm, comprising:
    an elongated housing having a longitudinal axis and defining a handgrip surface and forming an enclosure, the housing a having an upper end and a lower end having a flat contiguous bottom with an opening;
    a mount for attaching the upper end of the elongated housing to a firearm having a barrel, the mount for orienting the elongated housing substantially vertical to and perpendicular to a barrel of the firearm, the mount having a first horizontal clamp rail and an opposite facing second horizontal clamp rail that form a longitudinal cavity therebetween; the first and the second clamp rail for clamping about picatinny rails underneath of a firearm;
    a bipod having pivotable legs that form a generally upside down triangular configuration, the legs having an elongated portions and enlarged bottom ends, the bipod having a retracted position with the elongated portions of the legs and portions of the enlarged bottom end inside of the housing with other portions of the enlarged bottom ends of the legs extending beneath the flat contiguous bottom of the lower end of the housing, wherein the bipod is usable as a bipod support for the firearm.

2. The handgrip apparatus of claim 1, wherein the handgrip surface includes: parallel rows of stacked grooves on the handgrip surface to aid in gripping the housing by a hand of a user.

3. The handgrip apparatus of claim 1, wherein the bipod includes:
    a pivoting member for allowing the legs to move from a retracted position with the legs sandwiched with one another, to an expanded bipod position.

4. A method of attaching and removing a bipod from a firearm foregrip, comprising the steps of:
    providing an elongated foregrip having a longitudinal axis and defining a handgrip surface and forming an enclosure, the foregrip a having an upper end and a bottom end having a flat contiguous bottom with an opening therethrough;
    providing a first horizontal clamp rail member on the upper end;
    providing a second horizontal clamp rail member on the upper end;
    forming a longitudinal cavity between the first and the second rail members;

mounting the first and the second clamp rail members about picatinny rails located underneath of a firearm having a barrel, the elongated foregrip being substantially vertical to and substantially perpendicular to a barrel of the firearm;

providing a bipod having an upper end and legs that extend out to a bipod configuration, the legs having elongated portions and enlarged bottom ends;

retracting the upper end of the bipod into the opening in the bottom end of the foregrip so that the legs and portions of the enlarged bottom ends of the legs are located within the foregrip and with other portions of the enlarged bottom ends of the legs extending below the flat contiguous bottom of the bottom end of the housing; and extending the bipod to be positioned directly beneath the elongated foregrip and the bipod is usable as a bipod support for the firearm.

5. The method of claim 4, further comprising the step of:
providing parallel rows of stacked grooves on the handgrip surface to aid in gripping the surface by a hand of a user.

6. The method of claim 4, further comprising the step of:
pivoting the legs to move from a retracted position with the legs sandwiched with one another, to an expanded bipod position.

7. The handgrip apparatus of claim 1, wherein the enlarged bottom ends of the legs of the bipod include enlarged feet.

8. The method of claim 4, further including the step of:
providing enlarged feet as the elongated bottom ends on the legs of the bipod.

9. The handgrip apparatus of claim 1, wherein the enlarged bottom ends of the legs of the bipod include angled feet.

10. The method of claim 4, further including the step of:
providing angled feet as the enlarged bottom ends on the legs of the bipod.

11. A handgrip and bipod apparatus for a firearm, comprising:

an elongated housing having a longitudinal axis and defining a handgrip surface and forming an enclosure, the housing a having an upper end and a lower end having a flat contiguous bottom with an opening;

a mount for attaching the upper end of the elongated housing to a firearm, the mount having a pair of clamp rails for clamping adapted for clamping to a firearm having a barrel, the mount for orienting the elongated housing substantially vertical to and perpendicular to a barrel of the firearm; and a bipod having pivotable legs that form a generally upside down triangular configuration, each of the legs having an elongated portion and a footer, the bipod having a retracted position with the elongated portion of each leg and portion of the footer inside of the housing with another portion of the footer extending beneath the flat contiguous bottom of the lower end of the housing, wherein the bipod is usable as a bipod support for the firearm.

12. The handgrip and bipod apparatus of claim 11, wherein the footer of each leg includes a flat bottom surface.

13. The handgrip and bipod apparatus of claim 11, wherein the footer of each leg includes an angled portion.

\* \* \* \* \*